US006297874B1

(12) United States Patent
Ikeda et al.

(10) Patent No.: US 6,297,874 B1
(45) Date of Patent: Oct. 2, 2001

(54) FILM IMAGE READING DEVICE AND A STORAGE MEDIUM WHICH STORES A CONTROL PROCEDURE FOR THE FILM IMAGE READING DEVICE

(75) Inventors: Takahiro Ikeda, Tokyo; Eisaku Maeda, Sakura; Tadashi Ohta; Takuya Shirahata, both of Yokohama, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/377,711

(22) Filed: Aug. 20, 1999

Related U.S. Application Data

(63) Continuation of application No. 08/884,560, filed on Jun. 27, 1997, now abandoned.

(30) Foreign Application Priority Data

| Jun. 28, 1996 | (JP) | 8-170243 |
| Jun. 28, 1996 | (JP) | 8-170245 |
| Apr. 1, 1997 | (JP) | 9-083007 |

(51) Int. Cl.[7] .................................................. G03B 27/52
(52) U.S. Cl. ................................ 355/40; 396/567; 355/77
(58) Field of Search .......................... 355/40, 68, 77, 355/41; 396/567, 568, 311, 319, 575; 358/483, 487, 496

(56) References Cited

U.S. PATENT DOCUMENTS

| 4,933,713 | * | 6/1990 | Tsuji et al. | 355/68 |
| 5,019,858 | * | 5/1991 | Suzuli | 355/38 |
| 5,229,591 | * | 7/1993 | Heiman et al. | 235/472 |
| 5,550,639 | * | 8/1996 | Sugita | 358/483 |
| 5,555,047 | * | 9/1996 | Tsuji et al. | 396/311 |
| 5,703,701 | * | 12/1997 | Yamamoto et al. | 358/487 |
| 5,737,062 | * | 4/1998 | Yoshikawa | 355/40 |
| 5,745,218 | * | 4/1998 | Sugahara et al. | 355/40 |
| 5,750,985 | * | 5/1998 | Suzuki | 358/496 |
| 6,062,746 | * | 5/2000 | Stoebe et al. | 396/575 |

* cited by examiner

*Primary Examiner*—D. Rutledge
(74) *Attorney, Agent, or Firm*—Oliff & Berridge PLC

(57) ABSTRACT

A film scanner generates and stores data for display on a display monitor of a host Computer. A user can use the film scanner and the host computer to view thumbnail images recorded on a film roll and to verify, create, or adjust information recorded on the film roll. The information recorded on the film roll includes data regarding a) the film roll, b) images on the film roll, and c) parameters for printing the images. In particular, the data includes selections of film image frames for which duplicate prints are desired, as well as information regarding the type and characteristics of the film and shooting conditions for each exposed frame of the film. The film scanner can record data onto, and read is data from, magnetic regions of the film. The film scanner can also read bar code information recorded on the film.

47 Claims, 36 Drawing Sheets

FILM INFORMATION AUTOMATIC SETTING FIELD

- FILM TYPE : COLOR NEGATIVE
- FILM MODEL : COMPANY A XXX4000
- TOTAL NUMBER OF FRAMES : 40

Figure 6

FILM INFORMATION MANUAL SETTING FIELD

- FILM TYPE : COLOR NEGATIVE
- FILM MODEL : COMPANY A XXX4000
- TOTAL NUMBER OF FRAMES : 40

| O K | CANCEL |

Figure 7

INDEX DISPLAY SETTING WINDOW

◎ DISPLAY MAGNETIC INFORMATION ONLY
◎ DISPLAY IMAGE ONLY

1. COMMON CHOICE
   1 - 1. FRAMES TO BE DISPLAYED
      ◎ ALL FRAMES
      ◎ ALL FRAMES THAT HAVE BEEN SHOT
      ◎ H SIZE ONLY
      ◎ C SIZE ONLY
      ◎ P SIZE ONLY
      ◎ HORIZONTAL POSITION ONLY
      ◎ VERTICAL POSITION ONLY
      ◎ SELECTION FRAME (FROM FRAME TABLE)

| FRAME TABLE ||||||||||
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |

FRAMES SELECTED 1, 2, 3, 4, 5, 6, 7, • • • •.

1 - 2. ORDER OF DISPLAY
      ◎ FROM FIRST FRAME TO LAST FRAME IN ORDER
      ◎ FROM LAST FRAME TO FIRST FRAME IN ORDER
      ◎ IN THE ORDER OF SELECTION FROM THE FRAME TABLE
      ◎ IN THE ORDER OF PRINT SIZE
         1. [ H ]   2. [ C ]   3. [ P ]
      ◎ IN ORDER OF TITLE
   1 - 3. VERTICAL TO HORIZONTAL RATIO OF DISPLAY
VERTICAL : [    ] FRAMES   HORIZONTAL : [    ] FRAMES

Figure 8

INDEX DISPLAY SETTING WINDOW
1 - 4. METHOD OF DISPLAY
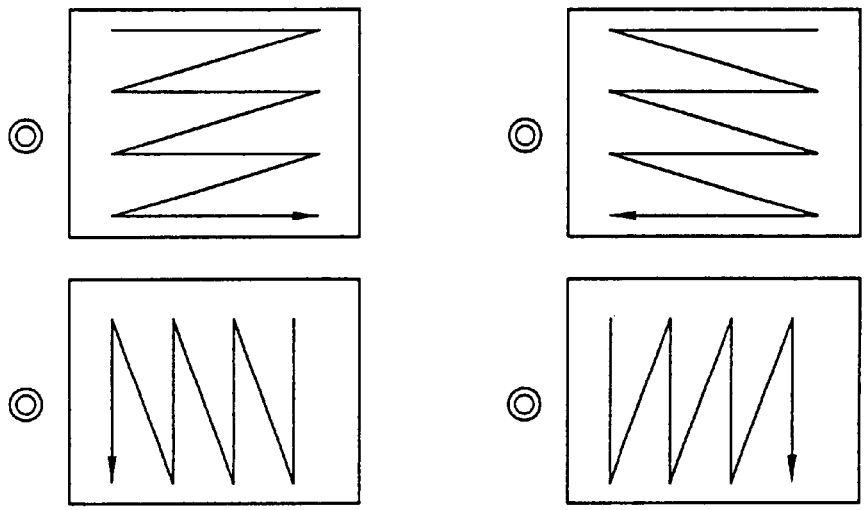
1 - 5. METHOD OF SIMULTANEOUS DISPLAY OF MAGNETIC
INFORMATION AND AN IMAGE
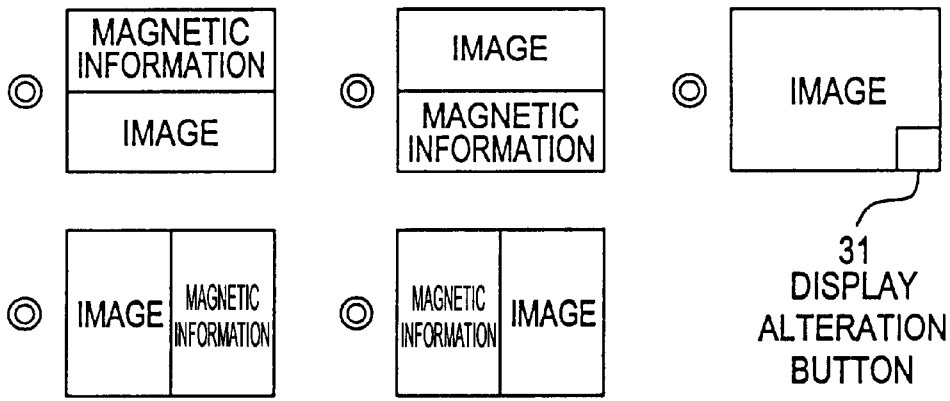
31 DISPLAY ALTERATION BUTTON
1 - 6. ◎ HIGH SPEED DISPLAY: [      ] FRAMES
1 - 7. ◎ DUPLICATE PRINTING DESIGNATION
Figure 9

INDEX DISPLAY WINDOW

2. DESIGNATED FRAME INFORMATION

2 - 1. DISPLAY INFORMATION

◎ DISPLAY ALL    ◎ SELECT AND DISPLAY 

3. DESIGNATED FRAME IMAGE

3 - 1. DISPLAY RANGE

◎ ALL   ◎ DESIGNATED PRINT SIZE

◎ H SIZE   ◎ C SIZE   ◎ P SIZE

SETTING RANGE

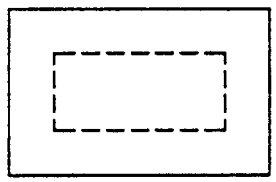

X1 : ☐ pixel
Y1 : ☐ pixel

X2 : ☐ pixel
Y2 : ☐ pixel

3 - 2. RESOLUTION PER FRAME : ☐ dpi

3 - 3. READING METHOD

◎ HIGH SPEED READING   ◎ HIGH QUALITY READING

3 - 4. COLOR DECOMPOSITION

◎ RGB DECOMPOSITION DISPLAY   ◎ CMY DECOMPOSITION DISPLAY

[ OK ]   [ CANCEL ]   [ INITIAL SETTING ]

Figure 10

TIME CHART FOR COLOR READING

TIME CHART FOR BLACK AND WHITE READING

TIME CHART FOR COLOR READING

TIME CHART FOR BLACK AND WHITE READING

INDEX DISPLAY WINDOW
OF MAGNETIC INFORMATION ONLY

| 1 | 2 | 3 | 4 | 5 |
|---|---|---|---|---|
| MAGNETIC INFO. | MAGNETIC INFO. | MAGNETIC INFO. | MAGNETIC INFO. | MAGNETIC INFO. |
| 6 | 7 | 8 | 9 | 10 |
| MAGNETIC INFO. | MAGNETIC INFO. | MAGNETIC INFO. | MAGNETIC INFO. | MAGNETIC INFO. |

⋮

| 31 | 32 | 33 | 34 | 35 |
|---|---|---|---|---|
| MAGNETIC INFO. | MAGNETIC INFO. | MAGNETIC INFO. | MAGNETIC INFO. | MAGNETIC INFO. |
| 36 | 37 | 38 | 39 | 40 |
| MAGNETIC INFO. | MAGNETIC INFO. | MAGNETIC INFO. | MAGNETIC INFO. | MAGNETIC INFO. |

FRAMES TO BE SCANNED 1, 3, 5, • •

SCAN OPERATION

[ SCAN ]   [ CANCEL ]

MAGNETIC INFORMATION ALTERATION

[ KEEP ]   [ CANCEL ]

MAGNETIC INFORMATION

TITLE :          ATHLETIC DAY

DATE SHOT :     OCTOBER 10, 1996

SHOOTING
CONDITIONS :    STROBE ON

EXPOSURE : APPROPRIATE

REVERSED LIGHT ? REVERSED LIGHT

LIGHT SOURCE : FLOURESCENT LAMP
                        •
                        •
                        •

IMAGE

MAGNETIC INFORMATION

TITLE :           ATHLETIC DAY

DATE SHOT :       OCTOBER 10, 1996

SHOOTING
CONDITIONS :      STROBE ON

EXPOSURE : APPROPRIATE

REVERSED LIGHT ? REVERSED LIGHT

LIGHT SOURCE : FLOURESCENT LAMP

```
┌─────────────────────────────────────┐
│  ┌───────────────────────────────┐  │
│  │                               │  │
│  │                               │  │
│  │            IMAGE              │  │
│  │                               │  │
│  │                               │  │
│  └───────────────────────────────┘  │
```

MAGNETIC INFORMATION

TITLE :            ATHLETIC DAY

DATE SHOT :        OCTOBER 10, 1996

SHOOTING
CONDITIONS :       STROBE ON

EXPOSURE : APPROPRIATE

REVERSED LIGHT ? REVERSED LIGHT

LIGHT SOURCE : FLOURESCENT LAMP

DUPLICATE PRINTING INFORMATION

NUMBER OF DUPLICATE PRINTS : 1

PRINT SIZE : H SIZE

PICTURE SIZE : CABINET SIZE

Figure 34

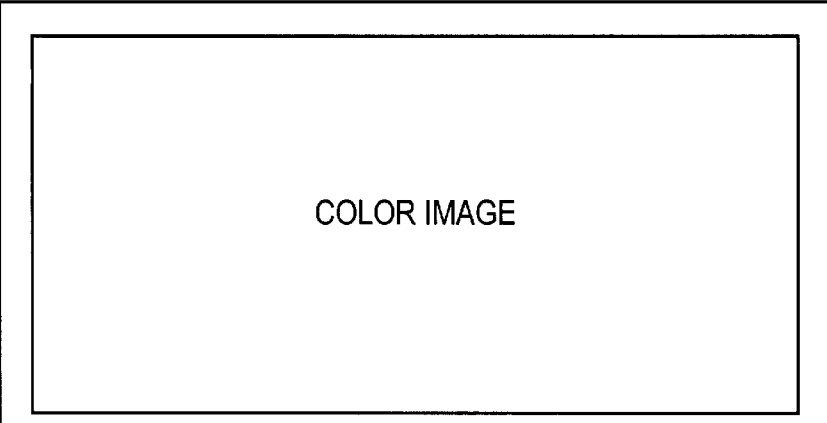
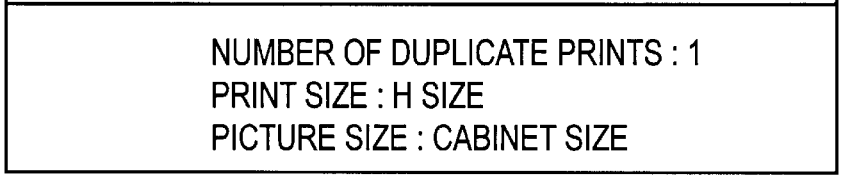
Figure 37
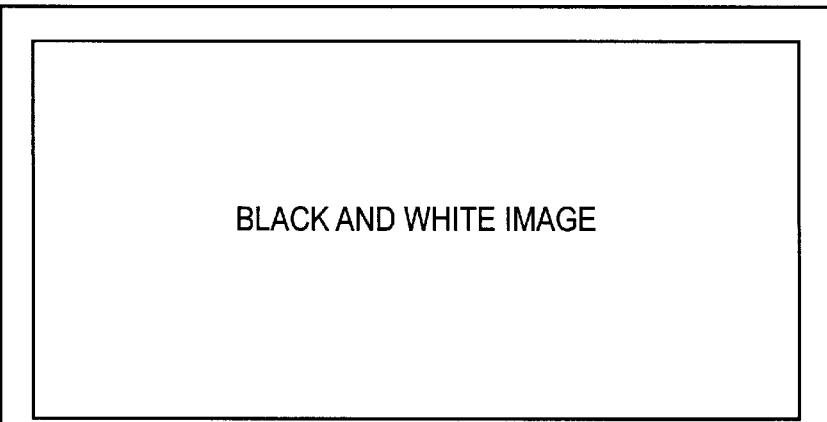
Figure 38

FILM IMAGE READING DEVICE AND A STORAGE MEDIUM WHICH STORES A CONTROL PROCEDURE FOR THE FILM IMAGE READING DEVICE

This is Continuation of Application Ser. No. 08/884,560 filed Jun. 27, 1997 now abandoned. The entire disclosure of the prior application(s) is hereby incorporated by reference herein in its entirety.

BACKGROUND OF THE INVENTION

1. Field of Invention

The present invention relates to a film image reading device and a storage medium. The storage medium stores control procedures for controlling the film image reading device.

2. Description of Related Art

A film image reading device which reads an image captured on film by a camera is known as a film scanner. Film scanners are used to read images recorded on a film, and to supply data representing the read images to a host apparatus such as a personal computer.

Two known types of film scanners are a transmission type film scanner and a reflection type film scanner. In a transmission type film scanner, light is transmitted through a film original on which images are recorded, and then received by a line sensor. In a reflection type film scanner, light is reflected from the film original and then received by a line sensor.

In both types of film scanner, the film original moves relative to the line sensor.

The line sensor is typically formed of an image accumulation unit, which is a plurality of photo-electric conversion units arranged in a row. The line sensor further includes a transfer unit to transfer accumulated electric charges from the image accumulation unit. The electric charge accumulated in each photo-electric conversion unit of the image accumulation unit is sequentially transferred to an external apparatus via the transfer unit. In this way, accumulated electric charges are sequentially scanned into the external apparatus from one end of the row of photo-electric conversion units to the other end. This image reading process is defined as main scanning, and the direction along the row of photo-electric conversion units is defined as a main scanning direction.

An image formed in an image region of a film original is read by moving the film original relative to the line sensor in a subscanning direction that is generally perpendicular to the main scanning direction.

Thus, the film scanner can read the images recorded on the film. When the film scanner is used with a host apparatus such as a personal computer, thumbnail images can be generated based on the read images and displayed on a display monitor in an image index.

Accordingly, when an operator desires duplicate print copies of an image on a frame of the roll film, the display monitor displays an image index to help the operator select image frames for duplicate printing. The operator notes the frame for which duplicate print copies are desired on a memo paper. However, this note-taking process is prone to error and making notes on memo paper is troublesome and time consuming.

SUMMARY OF THE INVENTION

Embodiments of the invention resolve these problems by providing a film image reading device that a user can use to easily and accurately designate frames of film for duplicate printing.

A new type of film is also proposed. The new film is a long strip of film (hereafter "roll film") which can be handled without being completely removed from a film cartridge housing, even after the roll film has been developed. Magnetic information can also be recorded on the roll film. The roll film has a magnetic memory region and a bar code in a lead part of the roll film. Film information regarding the roll film and regarding images recorded on the roll film can be stored in the magnetic memory region. In addition, the bar code can also represent film information. The film information can include, for example, a type and model of the roll film, frame number(s), total number of frames and other information regarding characteristics, properties, intended use and manufacturing history of the roll film. The type of the roll film indicates, for example, whether the roll film is color film or black and white film, and whether the roll film is positive or negative.

Accordingly, it is possible for a film image reading device to generate image index display data. The index display data can be sent from the film image reading device to the host apparatus, thus enabling the host apparatus to display thumbnails of the images recorded on the roll film on a display monitor.

Thus, a user can use the film image reading device and a host apparatus to view thumbnails of images recorded on a film roll and to verify, create, or adjust information regarding a) the film roll, b) images on the film roll, c) parameters for reading or scanning and printing the images and d) other options selected by the user that affect operation of the film image reading device and host computer. The information can be recorded on the film roll.

For example, information is recorded on the roll film to indicate duplicate printing that is desired for designated frames of the roll film.

A recording medium in also provided for storing control procedures for the film image reading device. The control procedures include functions to adjust and set scanning exposure conditions appropriately for a roll film based on film information stored on a lead part of the roll film.

According to embodiments of the invention, an illumination device (a light source) is also provided to illuminate a roll film original. An image sensor is also provided to receive light that has passed through image regions of the roll film original, and output corresponding image signals. A moving device moves at least one of the roll film original and the image sensor in the subscanning direction, which is generally perpendicular to the main scanning direction. Thus, the roll film original moves relative to the image sensor in the subscanning direction.

A magnetic information reader reads magnetic information stored in a magnetic memory region on the roll film, and a magnetic information writer writes magnetic information on the magnetic memory region. A memory is also provided to store data for display in an index display setting window on a display of a host apparatus.

An index display window data generator receives data from the image sensor and the magnetic information reader, and also receives settings information input by the user from the host apparatus. With this information, the index display window data generator generates index display window data including the duplicate printing information for display on the display of the host apparatus. A magnetic information writer receives duplicate printing data specified by the user from the host apparatus, and writes the duplicate printing data onto the lead part of the roll film original, or onto a magnetic memory region of a frame of the roll film original.

The data concerning duplicate printing which are input from the host apparatus can indicate a) the number of duplicate prints to be made, b) whether duplicate printing is to be performed for all the frames, or only for designated frames, c) a print size, and d) picture size.

The film image reading device generates index display window data, including duplicate printing information, in accordance with settings information received from the host apparatus. The film image reading device then sends the generated index display window data to the host apparatus for display on a display.

Moreover, the film image reading device writes the duplicate printing data on the magnetic memory region of the lead part or the corresponding frame of the roll film.

Accordingly, a user can easily use the index window displayed on the display to designate film roll frames for duplicate printing.

Moreover, the user can obtain duplicate prints by simply taking the film on which the duplicate printing designation information is recorded to a film developer.

As detailed above, the index display setting window data are sent to the host apparatus and the index display setting window is displayed on the display. If the user selects a high reading speed, the high reading speed designation is displayed in the index display setting window and the diaphragm value and the gamma characteristics for the image sensor are set to predetermined values.

Moreover, if the film information stored in the magnetic memory region and a bar code on a lead part of the roll film is recognized as usable in the film image reading device or the host apparatus, then the scanning exposure conditions are automatically set based on the recognized information. In this way the scanning exposure conditions of the film image reading device for the roll film original can be adjusted to correspond with characteristics of the roll film original being handled.

An original density of the roll film original can be estimated from the film information stored in the magnetic memory region and the bar code of the lead part of the film roll original. Scanning exposure conditions are set based on the estimated original density. Accordingly, the scanning exposure conditions of the apparatus in question can be adjusted to correspond to the characteristics of the roll film original.

The film image reading device according to the invention can also include a setting device. The setting device can set an accumulation time for the image sensor, and thus adjust a scanning exposure condition for the film image reading device. The accumulation time can be set based on whether the roll film original is negative film or positive film.

The setting device can also adjust a scanning exposure condition for the film image reading device by setting a diaphragm value of a diaphragm or adjustable aperture, through which the light source illuminates the roll film.

The film image reading device also generates selection choice display data for display on the display of the host apparatus. The displayed selection choices allow the user to choose, for example, whether parameters of the film image reading device are to be automatically set or manually set, and allow the user to manually set specific parameters. The film information stored in the magnetic memory region and the bar code of the lead part of the roll film can also be displayed together with the selection choices, so that the user can appropriately designate image reading, or scanning, conditions for the film image reading device.

The light source can be arranged to also illuminate the bar code provided in the lead part of the roll film original, thus simplifying the structure of the film image reading device.

The film image reading device can also include a measurement device for measuring an original density of the roll film original, based on an output of the image sensor. Based on the measurement, a correction device corrects or adjusts the estimated density of the roll film original to more accurately correspond with the actual density of the roll film original.

The film image reading device can also include a recognition device for determining whether the film information read from the roll film can be used by the film image reading device. If the information cannot be used, i.e., the recognition device falls to recognize the film information, then a recognition failure message is displayed on the display of the host apparatus.

The film image reading device can also include a detection device. The magnetic information reader can read magnetic information from the roll film when the detection device detects either a front edge of the roll film original that is being moved in the subscanning direction by a moving device, or a perforation in the roll film original that is closest to the front edge.

The film image reading device can further include a bar code reader for converting bar code information to film information. The conversion device converts the bar code information when the detection device detects the front edge of the film original or a perforation closest to the front edge, as the roll film original is being moved by the moving device in the subscanning direction.

A memory medium can also be provided to store control procedures for the film image reading device.

BRIEF DESCRIPTION OF THE DRAWINGS

The invention will be described in detail with reference to the following drawings in which like reference numerals refer to like elements and wherein:

FIG. 6 is a drawing showing an example of a film information automatic setting window display;

FIG. 7 is a drawing showing an example of a film information manual setting window display;

FIG. 8 is a drawing showing an example of an index display setting window;

FIG. 9 is a drawing showing an example of an index display setting window;

FIG. 10 is a drawing showing an example of an index display setting window;

FIG. 29 is a diagram showing an example of a display of a magnetic-information-only index display window;

FIG. 30 is an enlarged diagram of a frame of a magnetic-information-only index display window;

FIG. 32 is an enlarged diagram of a frame of magnetic information and an image index display window;

FIG. 34 is an enlarged diagram of the frame of the index display window capable of allowing duplicate printing to be designated;

FIG. 37 is an enlarged diagram of one of the frames of the index print of FIG. 35, with an index print duplicate printing designation;

FIG. 38 is an enlarged diagram of a frame without index print duplicate printing designations;

DETAILED DESCRIPTION OF PREFERRED EMBODIMENTS

A preferred embodiment of the present invention will now be shown with reference to the drawings.

Figure 1:
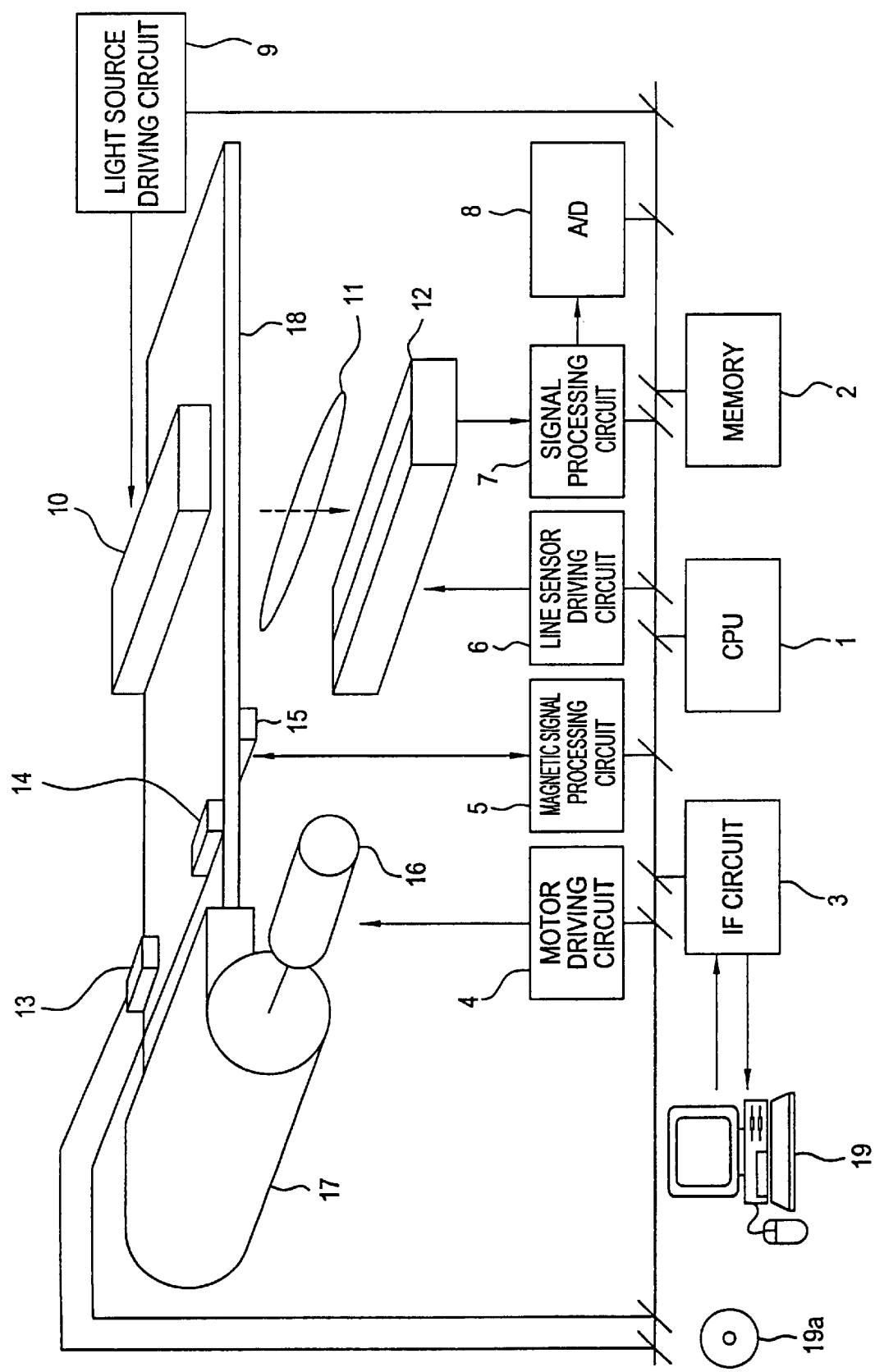
FIG. 1 is a structural diagram of a film image reading apparatus of an embodiment of the present invention.

FIG. 1 is a structural diagram of a film image reading apparatus according to a preferred embodiment of the present invention. As shown in FIG. 1, the film image reading apparatus includes a central processing unit (CPU) 1, a memory 2, an interface (IF) circuit 3, a motor driving circuit 4, a magnetic signal processing circuit 5 and a line sensor driving circuit 6. The film image reading apparatus further includes a signal processing circuit 7, an A/D converter 8, a light source driving circuit 9, a light source 10, a lens 11, a line sensor 12, a medium position detection sensor 13, an optical information reading sensor 14, a magnetic head 15, a motor 16 and a cartridge 17. The cartridge 17 can house the roll film 18. The IF circuit 3 is connected to a host computer 19. Data can be stored on a memory medium 19a.

Figure 2:
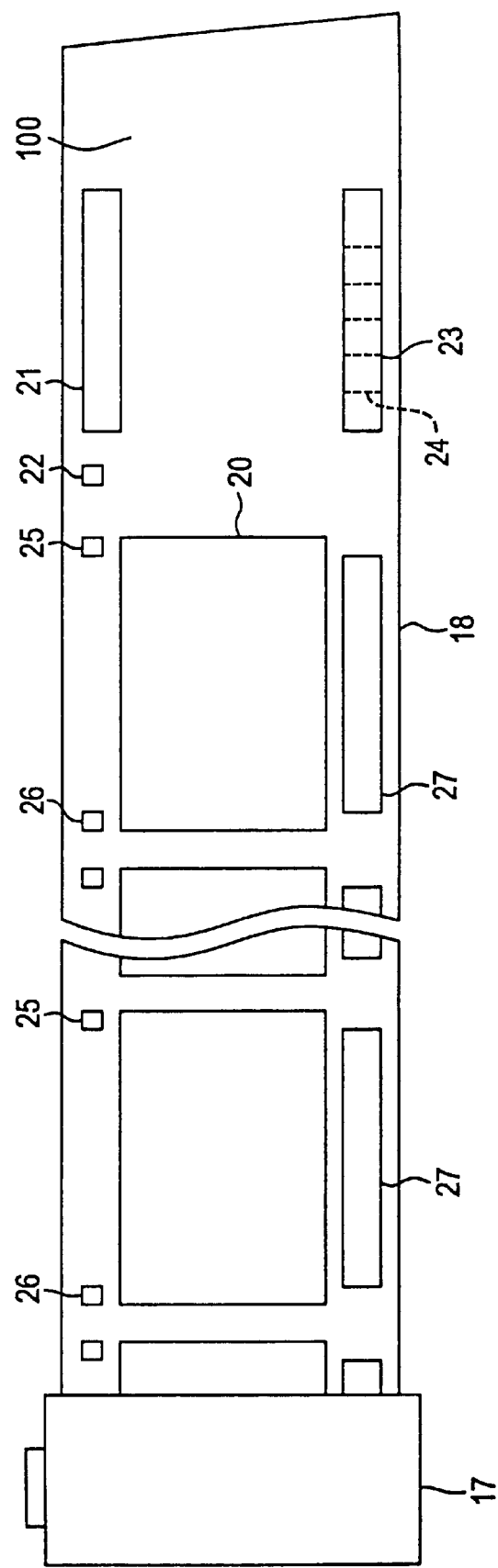
FIG. 2 is an external view of a roll film.

FIG. 2 is an external view of the roll film 18 and the cartridge 17. The roll film 18 in FIG. 2 is in the process of being scrolled from the cartridge 17. As shown in FIG. 2, specific regions in the tip edge of the roll film 18, i.e., the end of the roll film 18 furthest from the cartridge 17, are located in a lead part 100 of the roll film 18. Behind the lead part 100, each image region 20 of each frame is arranged a predetermined distance from adjacent image regions 20.

A magnetic memory region 21 and a perforation 22 are provided in the lead part 100 along one edge of the roll film, A magnetic memory region 23 and a bar code 24 are provided in the lead part along the other edge of the roll film. In each frame, two perforations 25, 26 are provided outside of the image region 20 along one edge in the direction of the width of the film. A magnetic memory region 27 is also provided outside of the image region 20 along the other edge in the direction of the width in each frame. As shown above, film information of the film is stored in the magnetic memory regions 21, 23. The bar code 24 also contains film density difference information.

The film information includes, for example, a type and model of the film, frame number, total number of frames and the like. The type of the film indicates whether the film is color or black and white, and whether the film is positive or negative. Information concerning image capture such as frame number, title, shooting date, shooting conditions and a designated print size also are recorded in the magnetic memory region 27 for each exposed frame. For example, the following print sizes can be designated; a high vision size (H size); a classic size (C size); and a panorama size (P size). The aspect ratio is 16:9 for the H size, 3:2 for the C size and 3:1 for the P size.

The camera can write information on the film during shooting. No information is recorded in the magnetic memory regions 27 if a camera does not have a magnetic writing function. Magnetic information also can be written on the film when the film is developed.

Film manufacturers usually write information in the magnetic memory regions 21, 23 in the lead part 100 before shipping the film. However, there can be special situations in which no information is written on the magnetic memory regions 21, 23 of the lead part 100.

To begin, a user mounts a cartridge 17 in a mounting chamber (not shown). Then the spool of the cartridge 17 is connected to the axle of the motor 16, as shown in FIG. 1. The user closes the lid of the mounting chamber. Then a power source supplies power to each circuit of the film image reading apparatus and each circuit is started.

The motor driving circuit 4 controls rotational velocity, rotational direction, stopping and the like of the motor 16 according to instructions from the CPU 1. When the motor 16 is driven in a first direction, the roll film 18 is scrolled out of the cartridge 17 on the transport path. When the motor 16 is driven in a second direction opposite to the first direction, the roll film 18 is wound from the transport path into the cartridge 17.

The medium position detection sensor 13 optically detects each perforation in the roll film and sends information to the CPU 1. The optical information sensor (bar code reader) 14 reads bar codes containing the film information and sends the information to the CPU 1.

The magnetic head 15 reads magnetic information from the magnetic memory regions 21, 23, 27 under the control of the magnetic signal processing circuit 5 and sends the read information to the CPU 1. The magnetic head 15 also writes information into the magnetic memory regions 21, 23, 27 under the control of the magnetic signal processing circuit 5.

The magnetic signal processing circuit 5 digitizes the magnetic information read by the magnetic head 15 and sends the digitized information to the CPU 1 under the control of the CPU 1. The magnetic signal processing circuit 5 also sends the magnetic head 15 information to be written in the magnetic memory region 27 under control of the CPU 1.

The light source 10 illuminates one face of the roll film 18 under control of the light source driving circuit 9. The light source 10 is provided with three colors of light emitting diodes (LEDs) such as red (R), green (G) and blue (B). In this case, the light source driving circuit 9 controls turning on and off of the three colors of LEDs of the light source 10 according to instructions from the CPU 1. The light source 10 can be a white-light light source. In this case, R, G and B filters can be provided. A switching mechanism for filtering three colors is necessary if a three color filter is provided.

The lens 11 is adjusted and arranged to direct light rays from the light source 10 that have passed through the roll film 18 onto a light receiving surface of the line sensor 12. The line sensor 12 is provided with an image accumulation unit which is a plurality of photo-electric conversion units arranged in a row. The line sensor 12 is also provided with a transfer unit to transfer electric charge accumulated in each of photo-electric conversion unit. The line sensor 12 is arranged in such a manner that the light receiving surfaces of the plurality of photo-electric conversion units are arranged in a row to be perpendicular to the direction of the movement of the roll film 18.

The line sensor 12 is either a black and white image sensor or a color image sensor. The light source 10 to be used for the black and white image sensor is a light source which a) alternately provides three colors of light, R, G and B, or b) is a white-light light source. The light source 10 used for a color image sensor is a white-light light source.

The line sensor driving circuit 6 performs the following control operations under direction of the CPU 1. The line sensor driving circuit 6 controls an accumulation operation and an accumulation time of the line sensor 12. The line sensor driving circuit 6 also controls the main scanning operation which discharges the accumulated electric charge to the signal processing circuit 7. The accumulated electric charges are electric signals that represent an image.

The signal processing circuit 7 amplifies the signals received from the line sensor 12, performs signal processing and sends the result to an A/D converter 8 according to instructions from the CPU 1. The signal processing performed by the signal processing circuit 7 includes processing such as correlated double sampling (CDS), shading correction, dark current correction, and even-odd correction. The A/D converter 8 converts image signals sent from the signal processing circuit 7 into digital signals with a predetermined number of bits and sends the converted signals to the CPU 1. The predetermined number of bits can be eight, for example.

The CPU 1 performs the following control operations according to a program which is set in the memory 2. The CPU 1 controls the motor driving circuit 4, the magnetic signal processing circuit 5, the line sensor driving circuit 6 and the light source driving circuit 9 to perform reading of the roll film 18. The CPU 1 also sets the accumulation time and the like for the line sensor 12 to accumulate electric charge according to information regarding scanning exposure conditions which is obtained from the host computer 19.

Next, the CPU 1 detects positions of perforations in the roll film and decodes the contents of the bar codes, based on outputs from the medium position detection sensor 13 and the optical information reading sensor 14. The CPU 1 also takes in magnetic information and a film image which have been read and processed by the magnetic signal processing circuit 5, signal process circuit 7 and the A/D converter 8, and stores them in the memory 2. At this time, the CPU 1 stores the line data (i.e., image data) equivalent of one or several frames which are read into the memory 2 as information comprising three colors: R, G and B. Alternatively, the CPU 1 stores the line data equivalent of one or several frames which are read in the memory 2 as information corresponding to one of three colors: R, G and B.

The CPU 1 obtains data concerning the display monitor from the host computer 19 through the IF circuit 3. The data can include, for example, screen size and display color numbers. The screen size is obtained in order to define a reading resolution given a relationship between the number of frames and the screen size. The CPU 1 also obtains scanning exposure conditions setting data, which are set by the user from the host computer 19 through IF circuit 3 and displayed on the display monitor. The memory 2 consists of a program memory and a working memory. Selection window data, index display setting window data and the like are also stored in the memory 2.

The IF circuit 3 of the configuration of the first embodiment is a small computer system interface (SCSI). The IF circuit 3 outputs line data (i.e., image data) stored in the memory 2 to the host computer 19. The IF circuit 2 also sends frame designations and other commands as well as display monitor information from the host computer 19 to the CPU 1.

The host computer 19 has a central processing apparatus, a program memory that is a read only memory (ROM), a working memory that is a random access memory (RAM)

and a hard disk drive (HDD). In addition, the host computer 19 has a display monitor, a keyboard that functions as an input device, a mouse, a printer, and a memory medium such as a CD-ROM. The host computer 19 displays image data received from the IF circuit 3 on the display monitor. The host computer 19 also sends commands which are input by the user via the keyboard and the mouse to the IF circuit 3.

Figure 3:
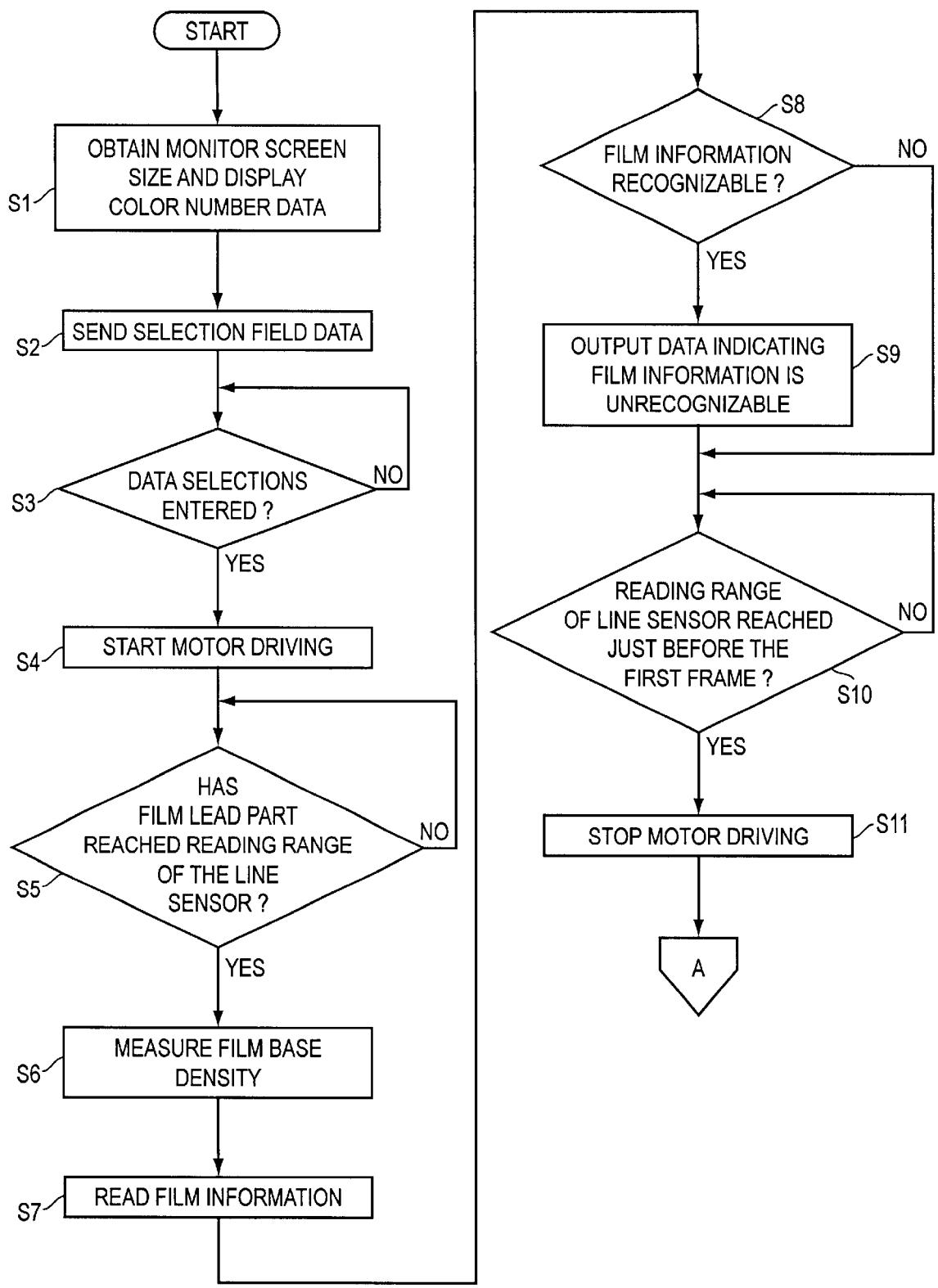
FIG. 3 is a flow chart of initial operations in the embodiment of the present invention.
Figure 4:
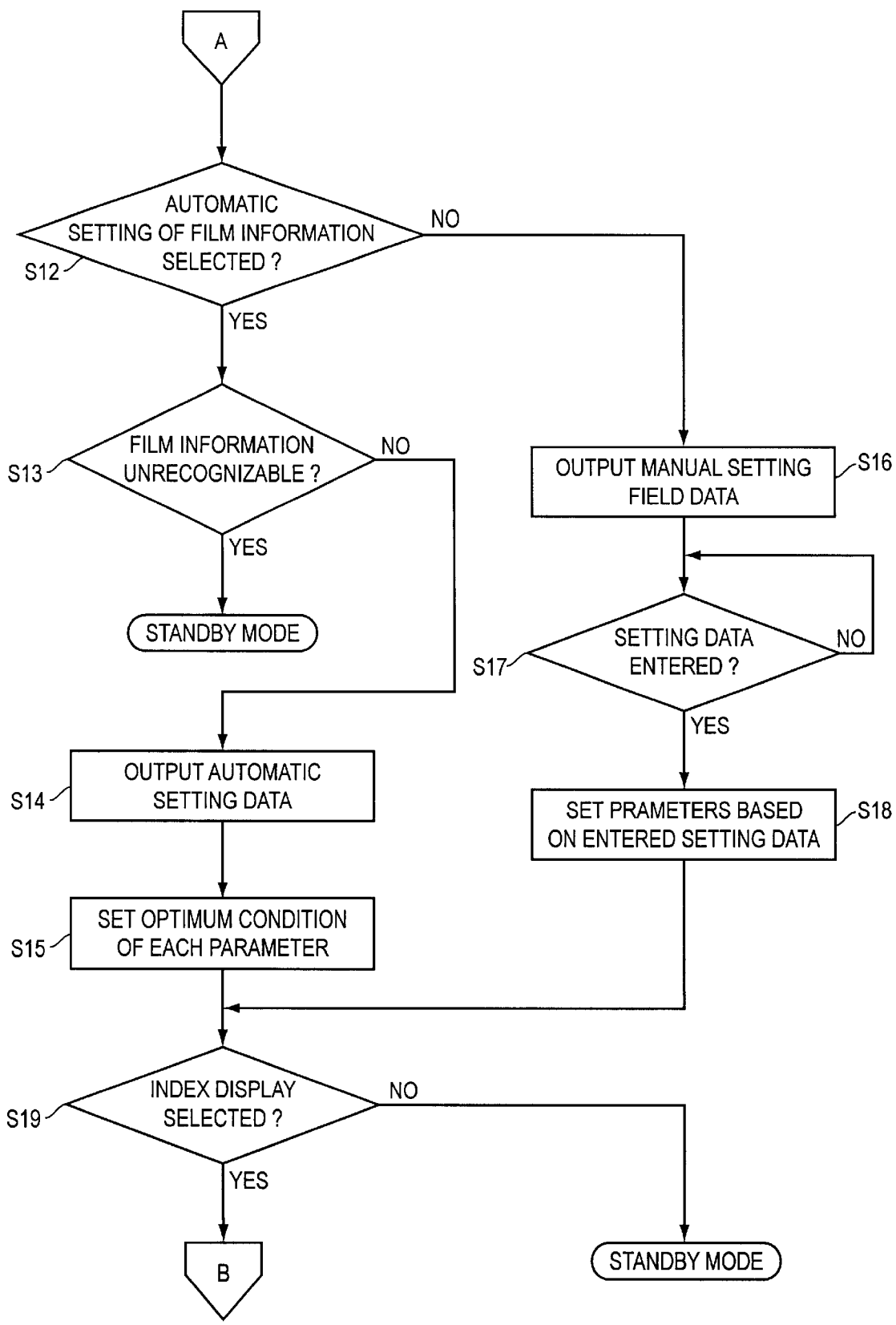
FIG. 4 is a flow chart of initial operations in the embodiment of the present invention.

Operation of the first embodiment is shown in FIGS. 3–40, centering around operations of the CPU 1. In particular, FIGS. 3 and 4 are flow charts showing initial operations of the first embodiment. FIGS. 5 (a) and (b) show examples of selection window displays. FIG. 6 shows an example of a film information automatic setting window display. FIG. 7 shows an example of a film information manual setting window display. FIGS. 8–10 show examples of index display setting window displays.

Figure 11:
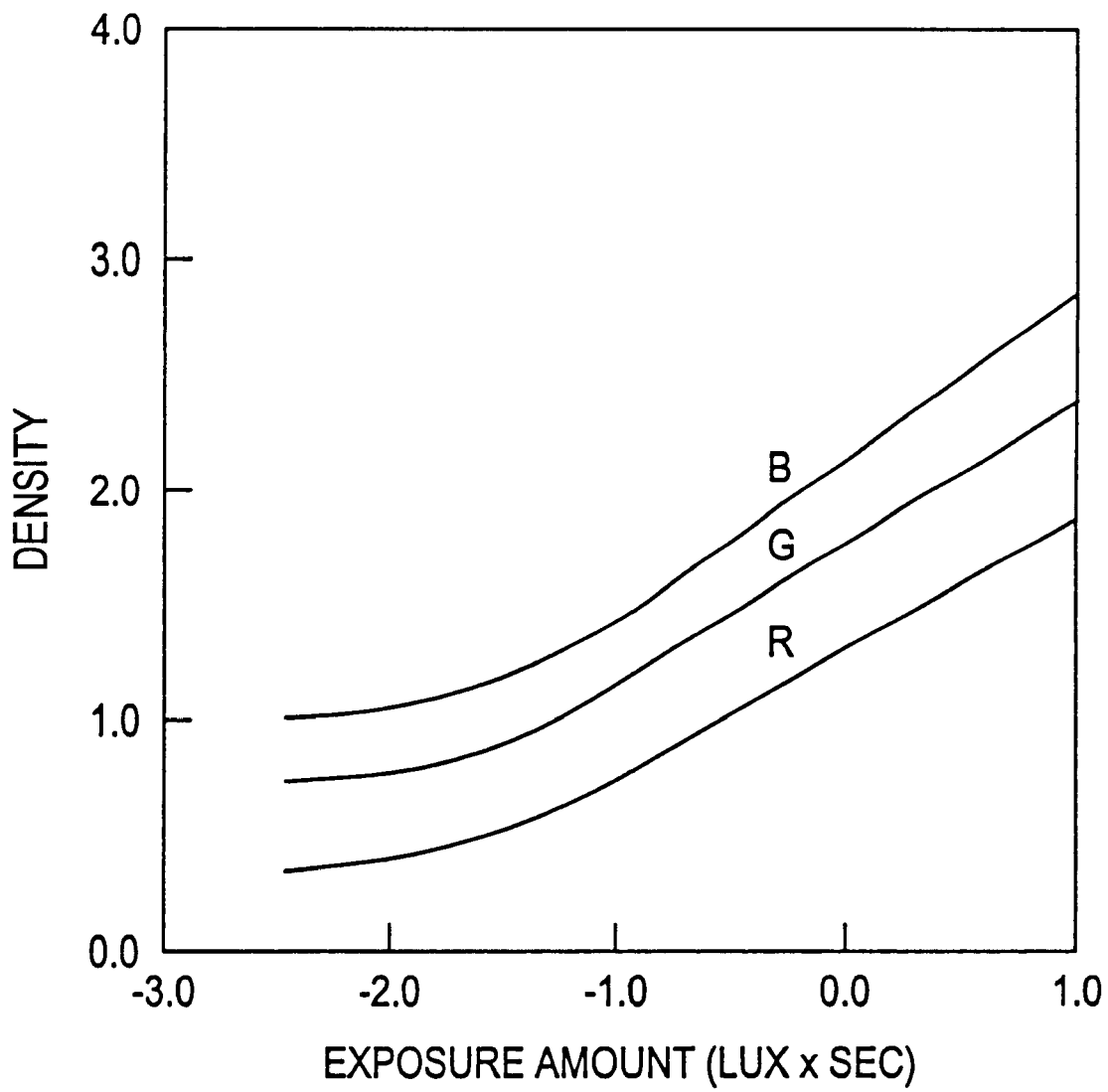
FIG. 11 is a drawing showing a relationship between a scanning exposure amount and an original density of a film negative.
Figure 12:
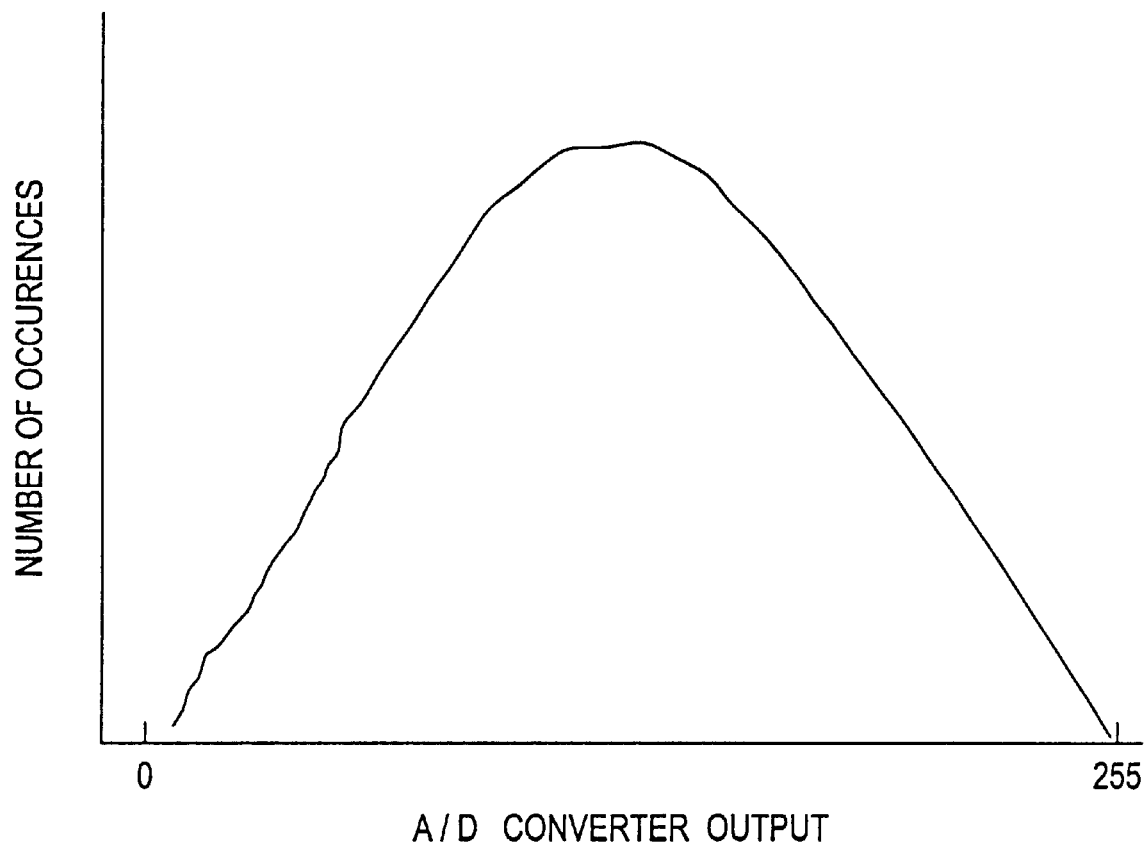
FIG. 12 is a drawing showing a density distribution based on an ideal scanning exposure time.
Figure 13:
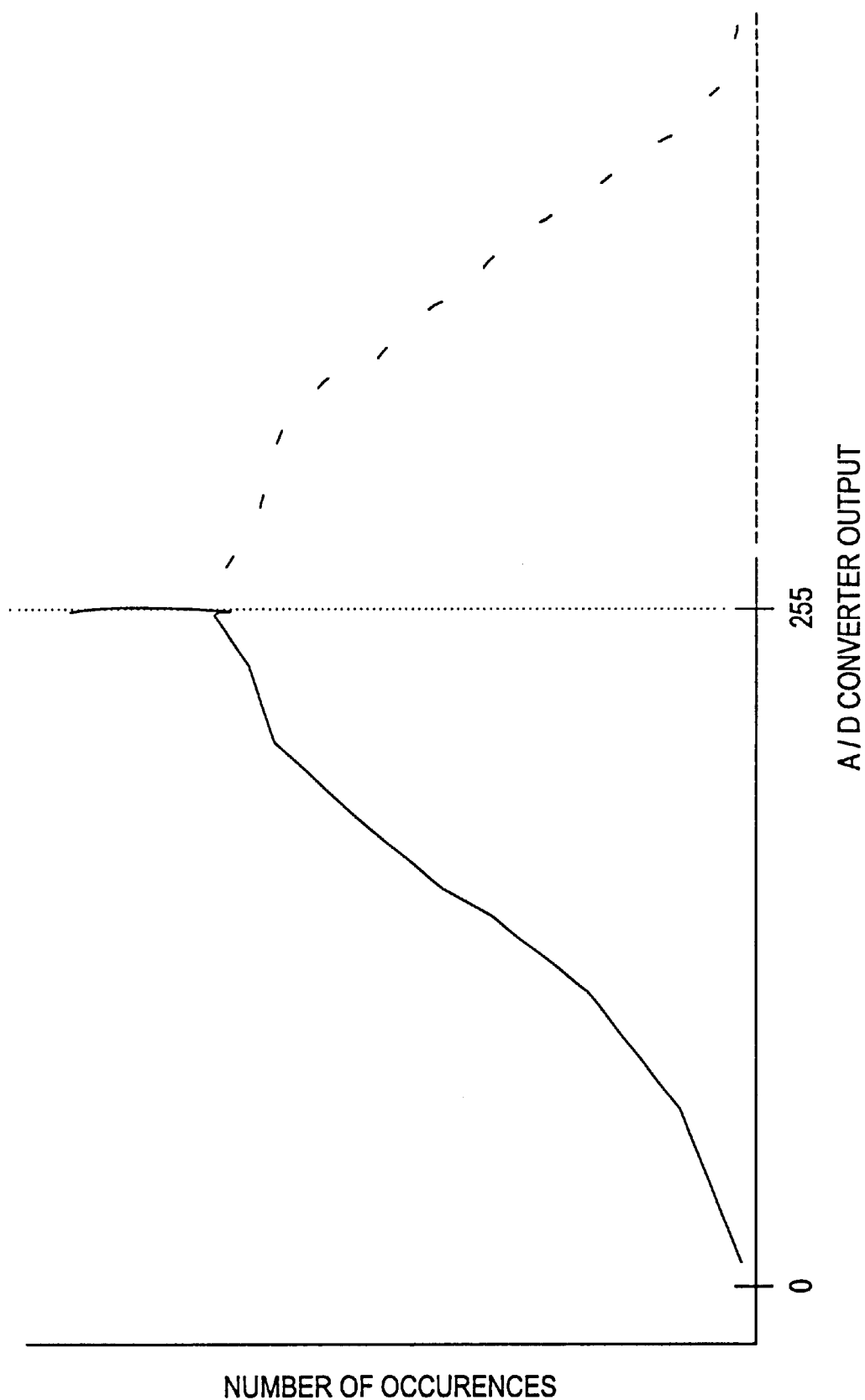
FIG. 13 is a drawing showing a density distribution when a scanning exposure time is too large.
Figure 14:
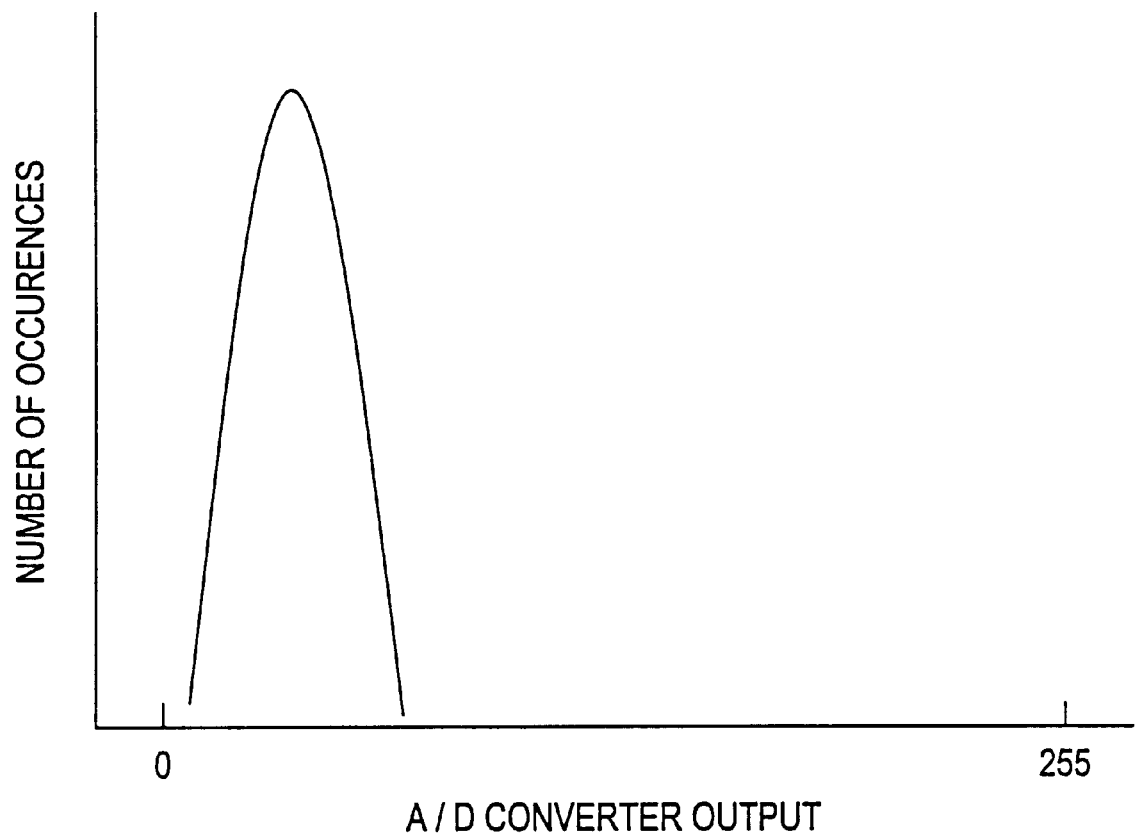
FIG. 14 is a drawing showing a density distribution when scanning exposure time is too small.

FIG. 11 shows a relationship between a scanning exposure amount and a density of the negative roll film. FIG. 12 shows a density distribution based on an ideal scanning exposure time. FIG. 13 shows a density distribution resulting from a scanning exposure time which is too large. FIG. 14 shows a density distribution resulting from a scanning exposure time which is too small.

Figure 15:
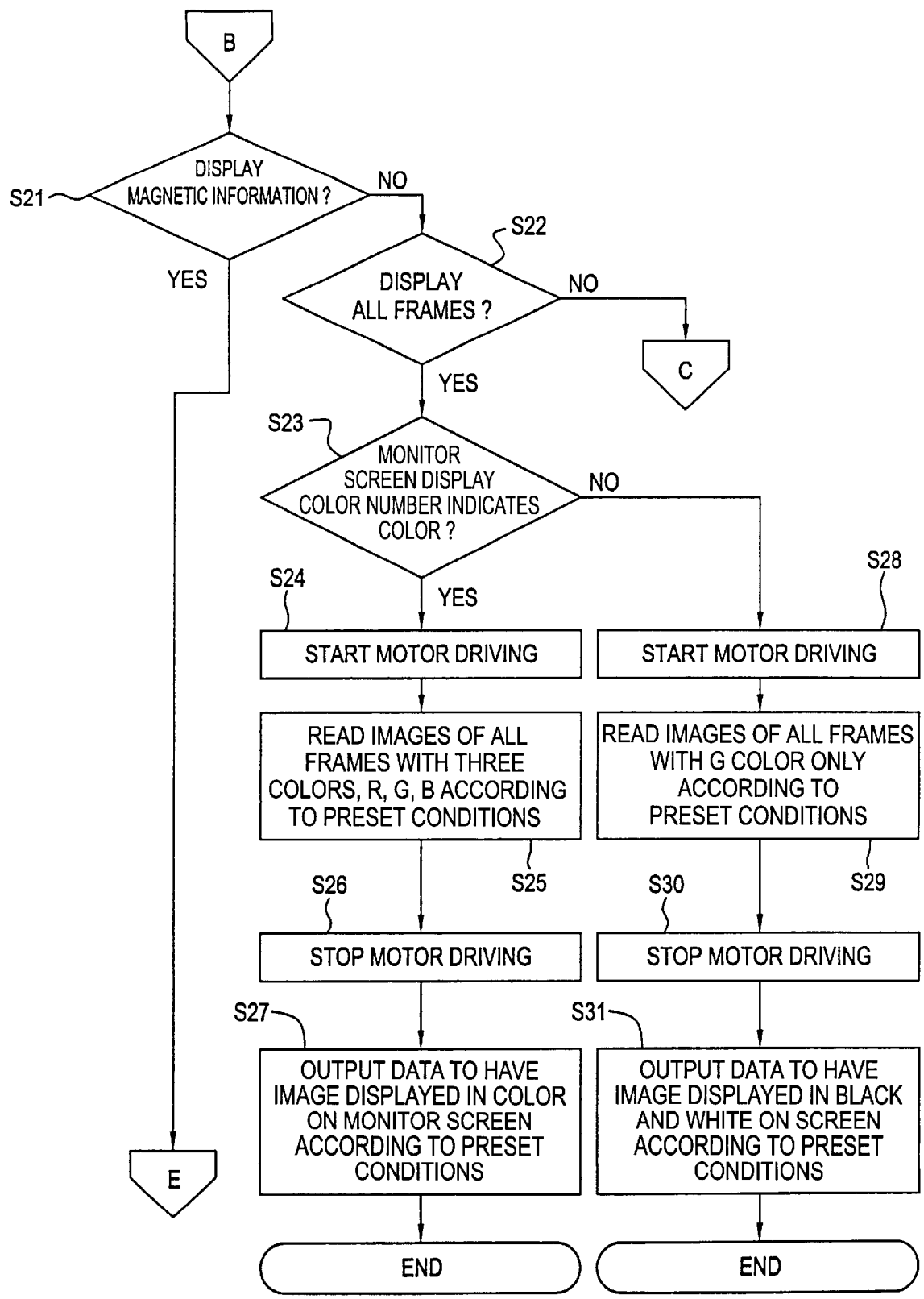
FIG. 15 is a flow chart of the index display data generation process in the embodiment of the present invention showing an index display of images only.
Figure 16:
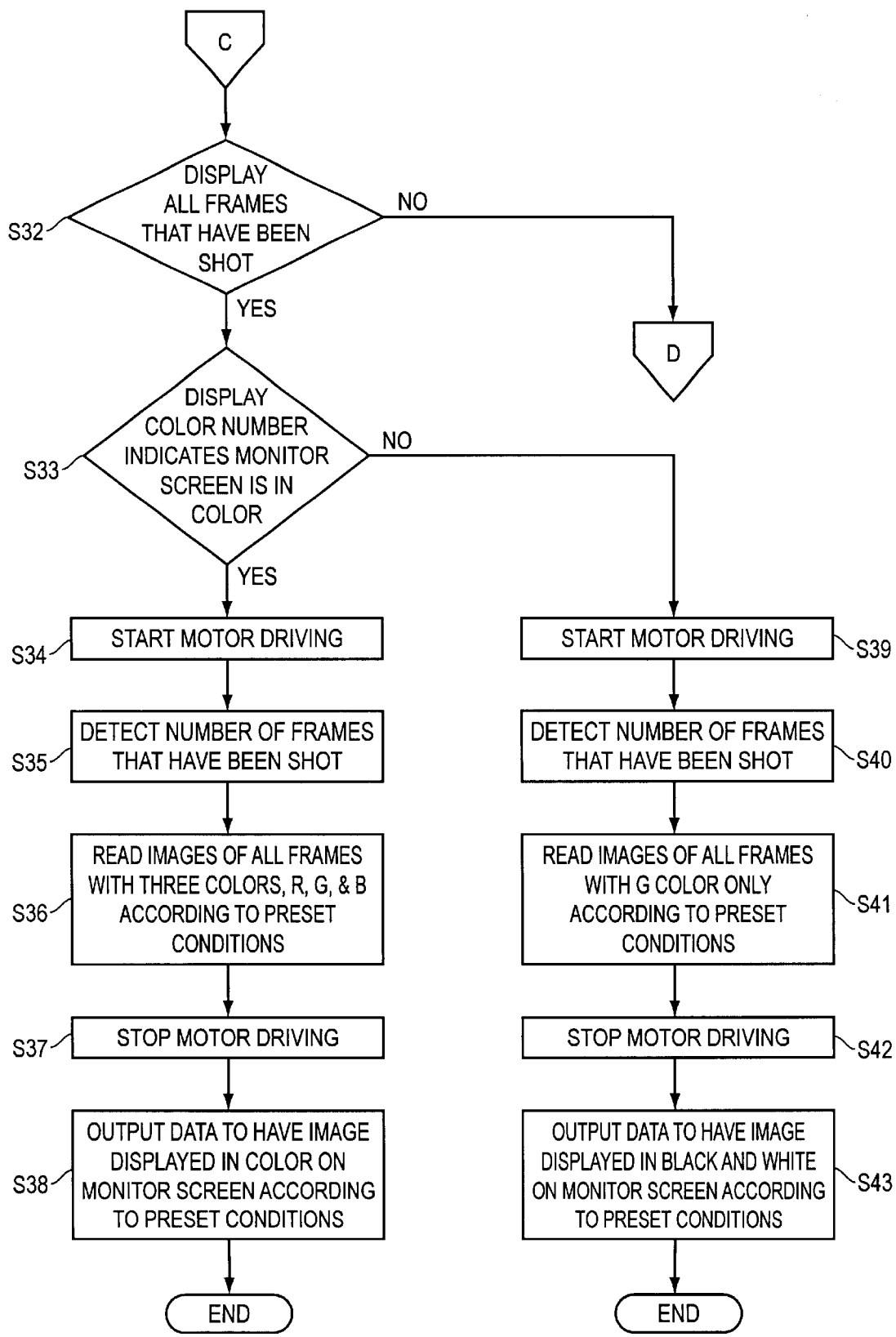
FIG. 16 is a flow chart of the index display data generation process in the embodiment of the present invention showing an index display of images only.
Figure 17:
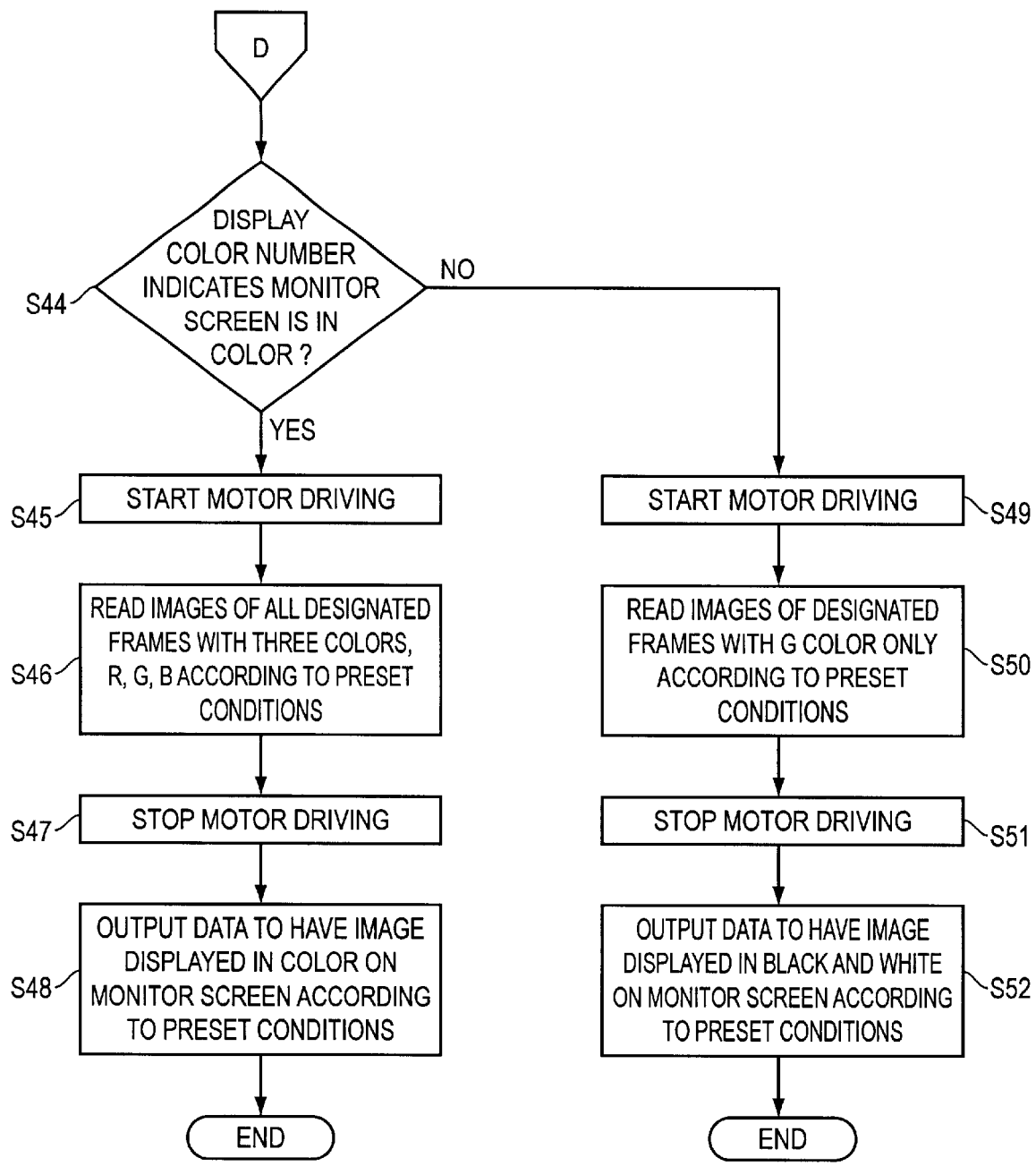
FIG. 17 is a flow chart of the index display data generation process in the embodiment of the present invention showing an index display of images only.
Figure 18:
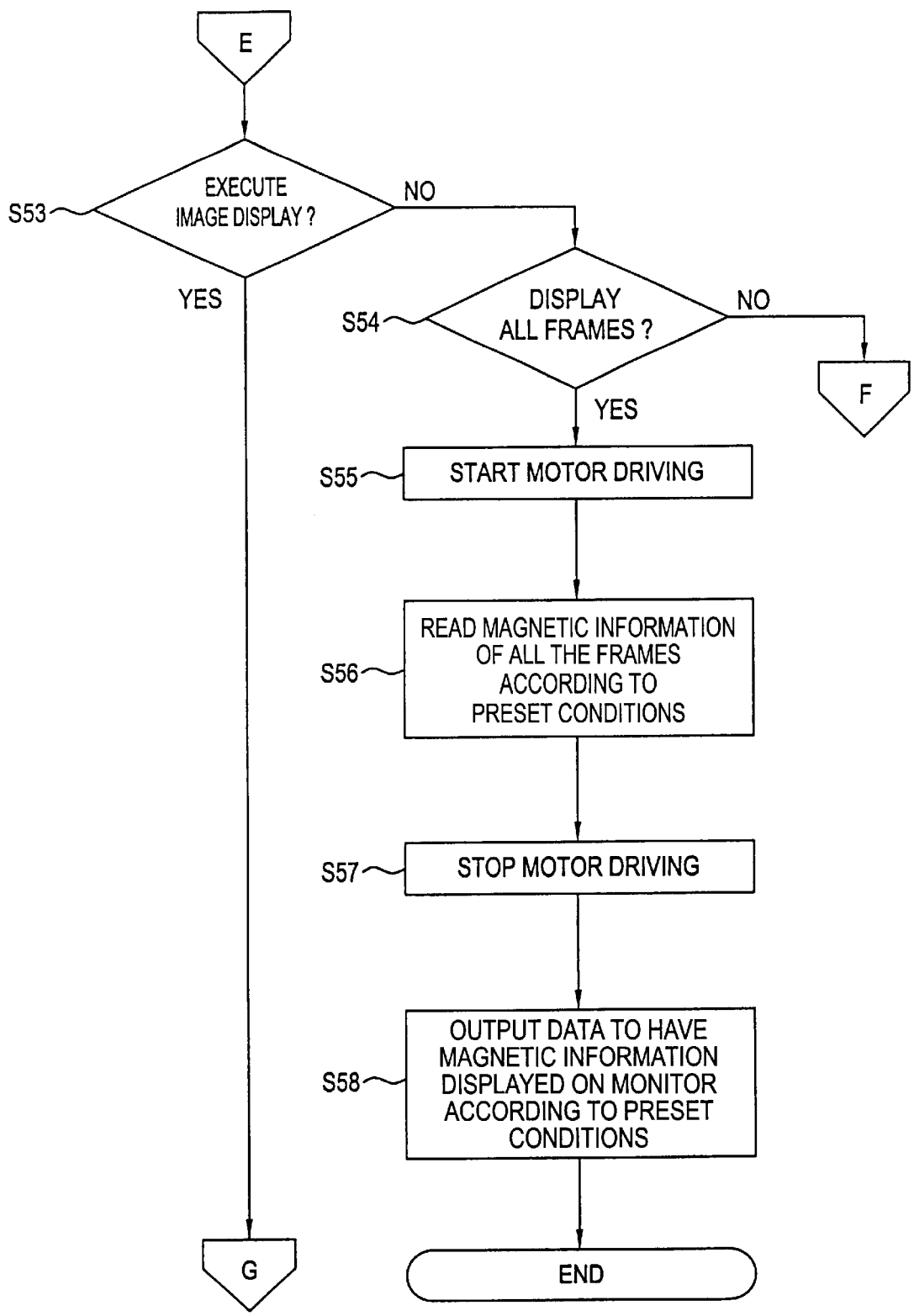
FIG. 18 is a flow chart of the index display data generation process in the embodiment of the present invention showing an index display of magnetic information only.
Figure 19:
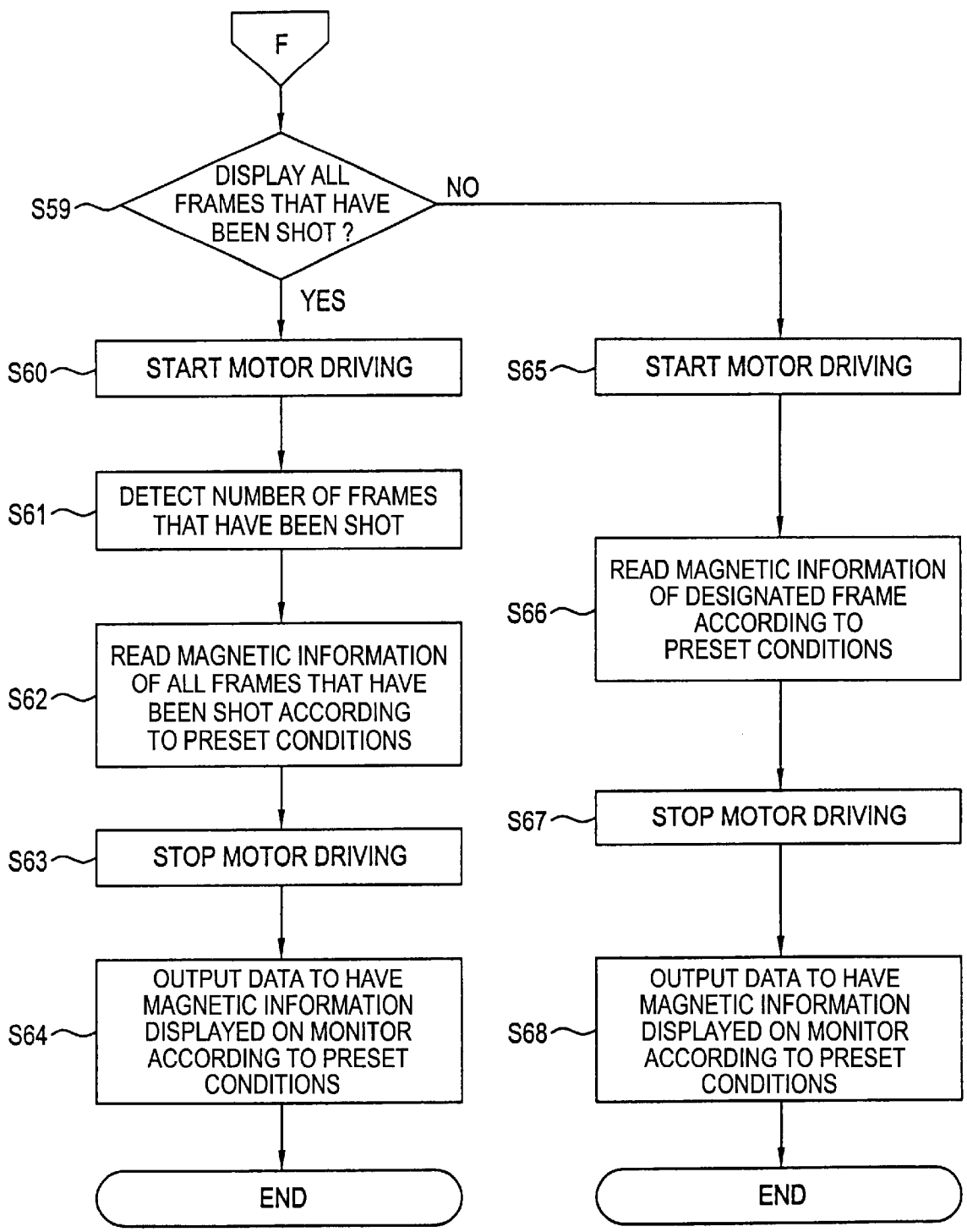
FIG. 19 is a flow chart of the index display data generation process in the embodiment of the present invention showing an index display of magnetic information only.
Figure 20:
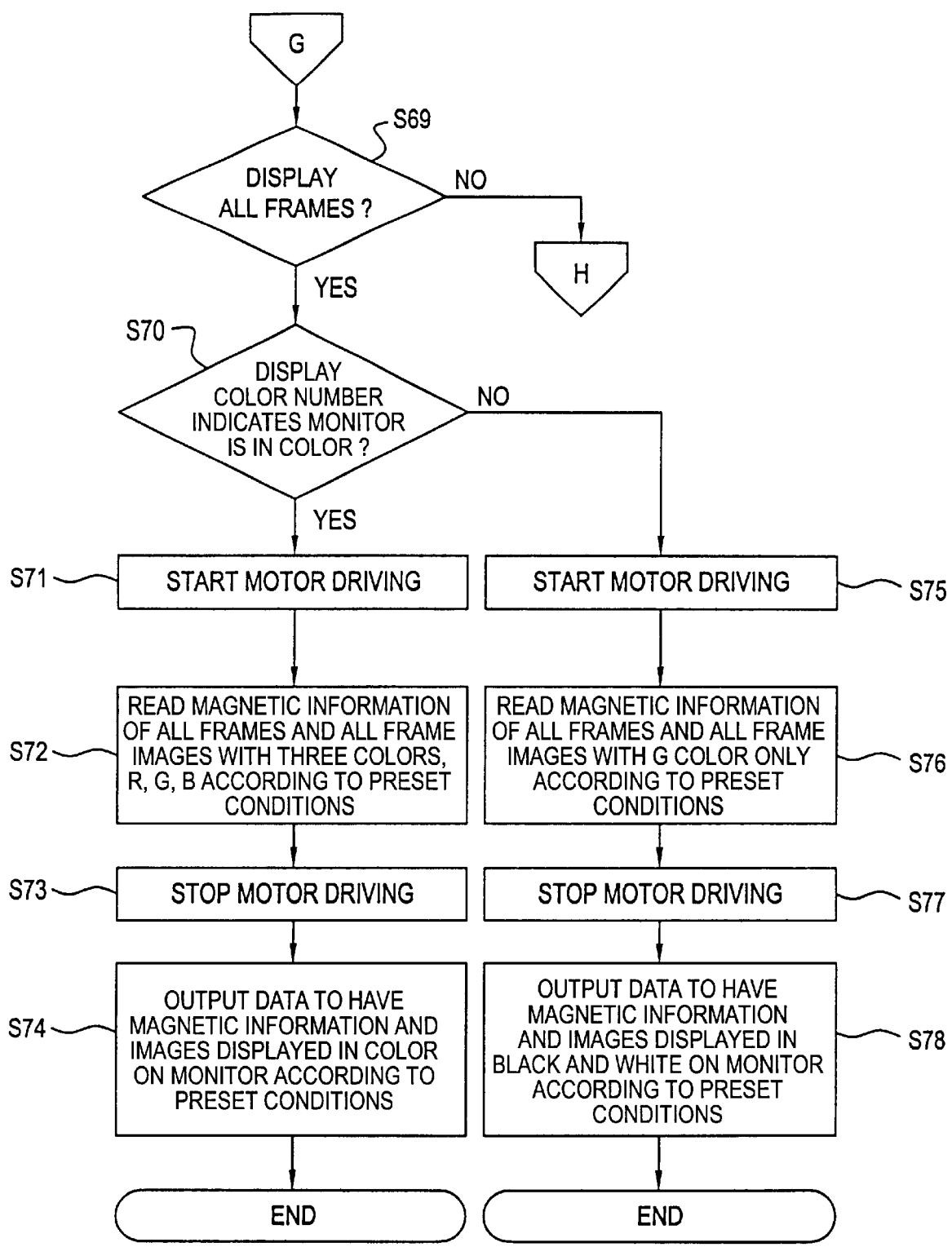
FIG. 20 is a flow chart of the index display data generation process in the embodiment of the present invention showing an index display of magnetic information and images.
Figure 21:
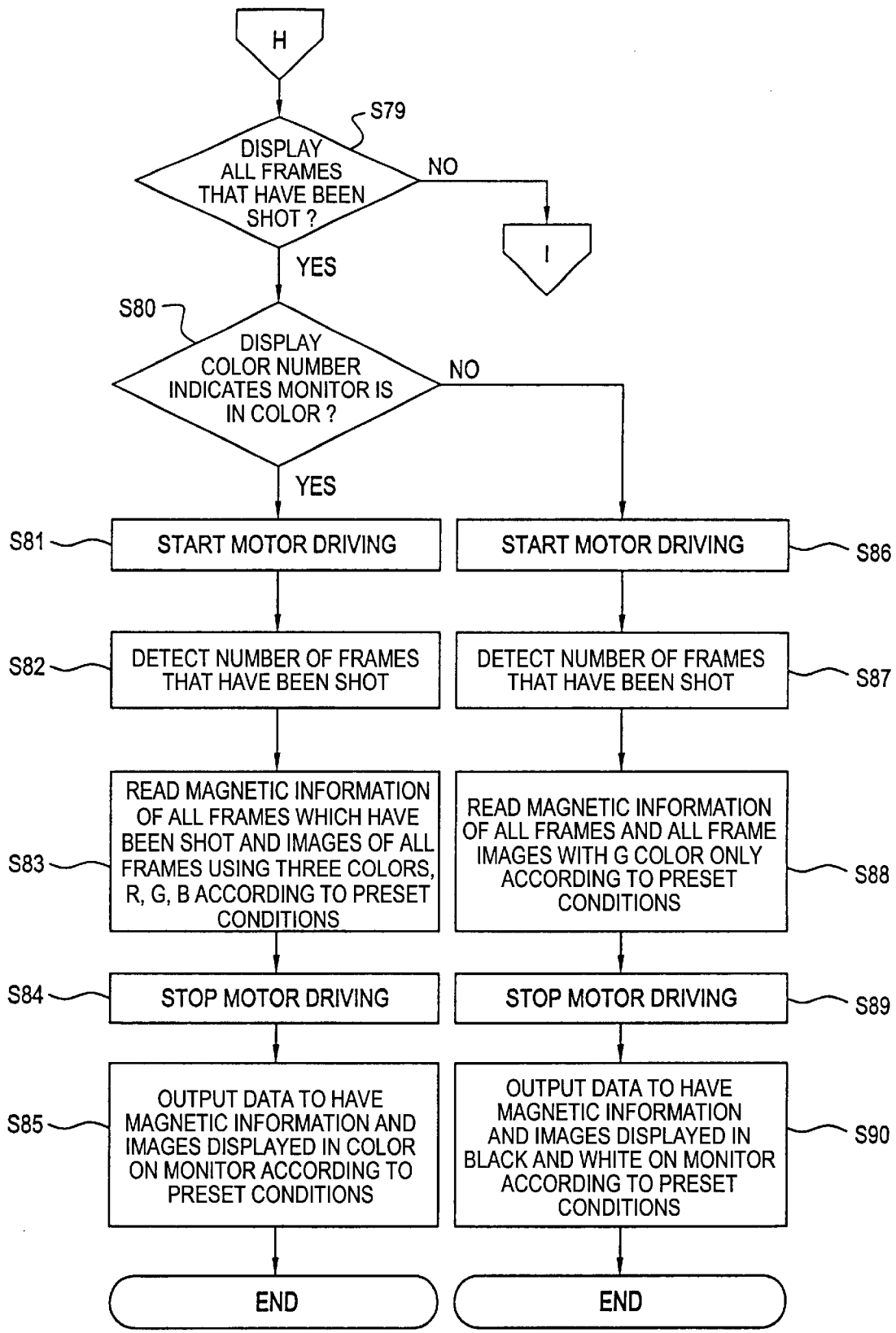
FIG. 21 is a flow chart of the index display data generation process in the embodiment of the present invention showing an index display of magnetic information and images.
Figure 22:
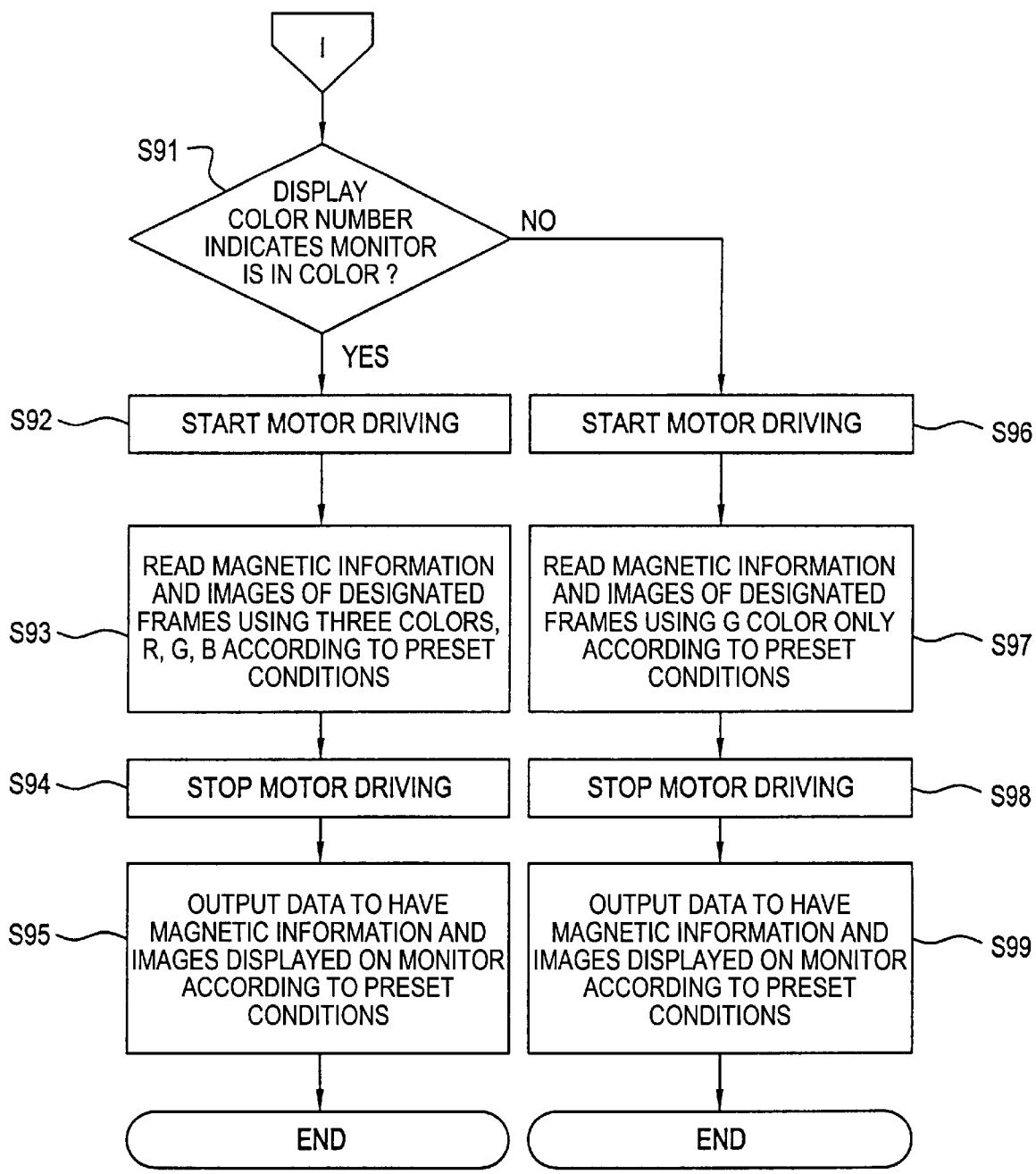
FIG. 22 is a flow chart of the index display data generation process in the embodiment of the present invention showing an index display of magnetic information and images.

FIGS. 15–22 are flow charts of index display data generation operations in the first embodiment. FIGS. 15–17 relate to an index display of only an image. FIGS. 18 and 19 relate to an index display of only magnetic information. FIGS. 20–22 relate to an index display of both magnetic information and an image.

Figure 23A:
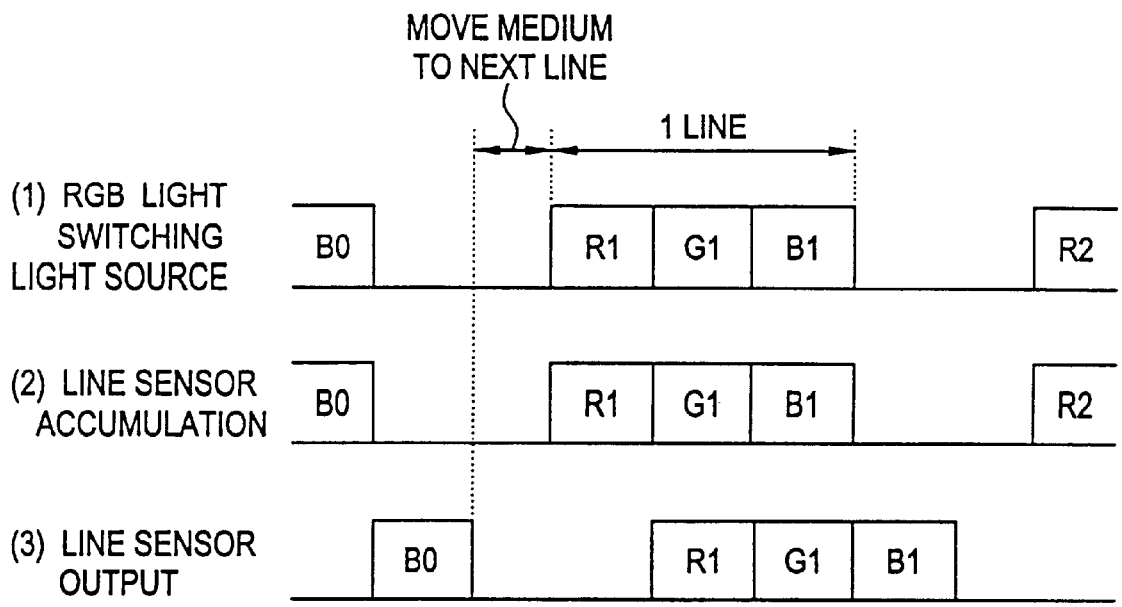
FIG. 23(a) is a time chart for color reading by RGB switching.
Figure 24A:
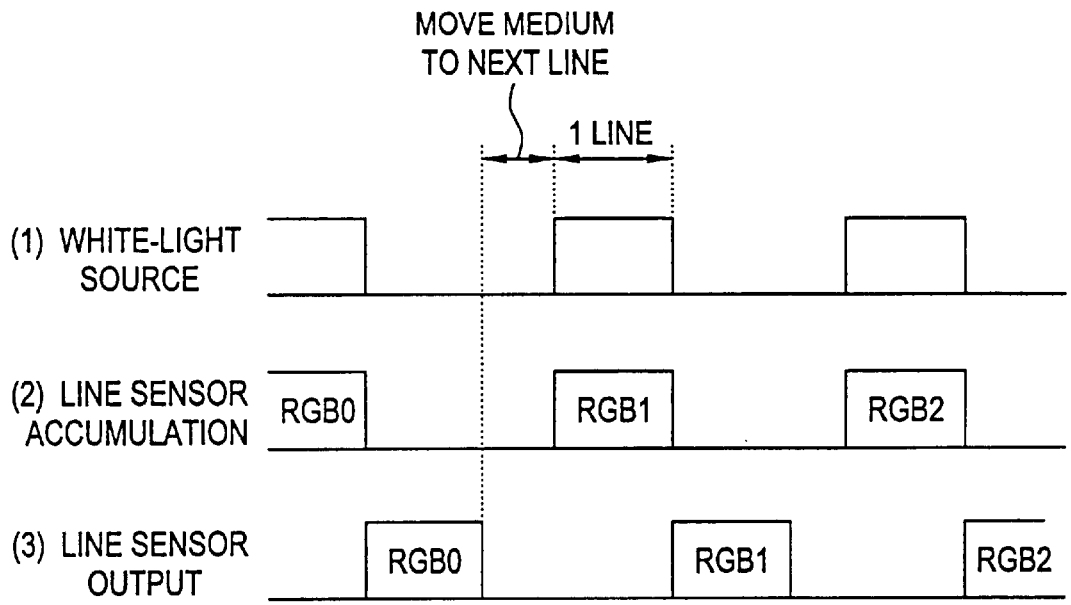
FIG. 24(a) is a time chart for color reading by a color image sensor.
Figure 24B:
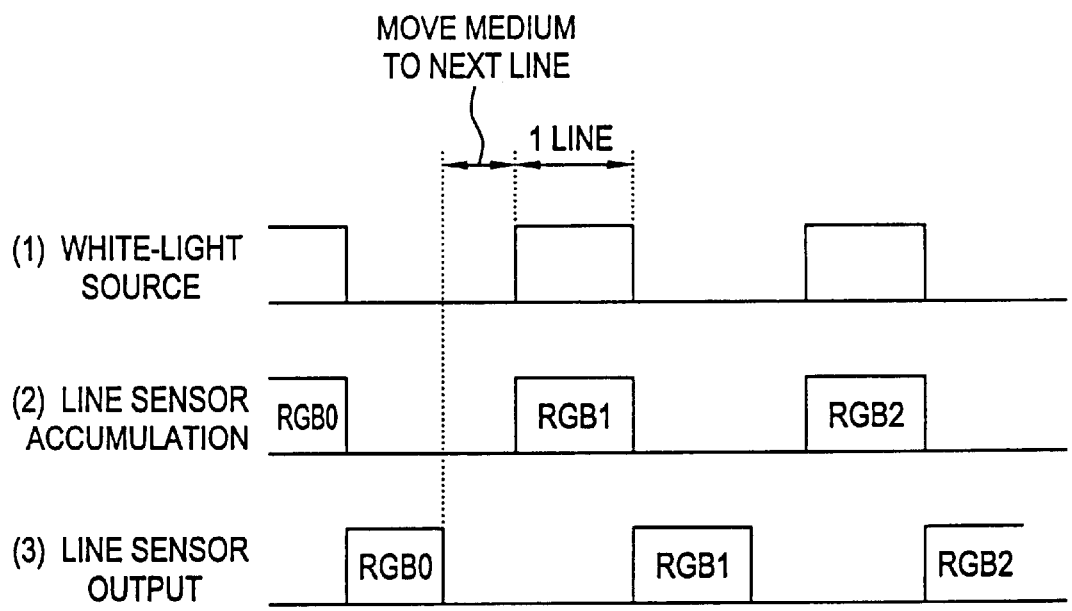
FIG. 24(b) is a time chart for black and white reading by a color image sensor.
Figure 25:
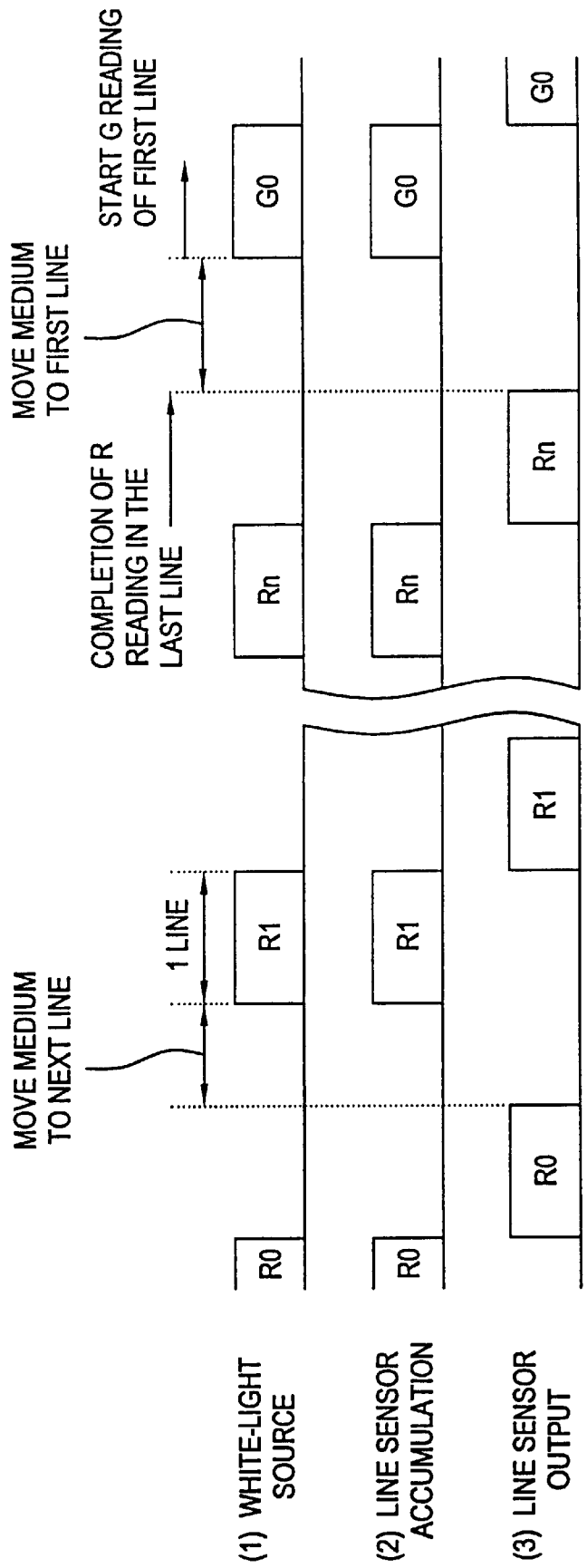
FIG. 25 is a time chart of the image reading by white light and RGB filter switching in the case of three path color reading.
Figure 26:
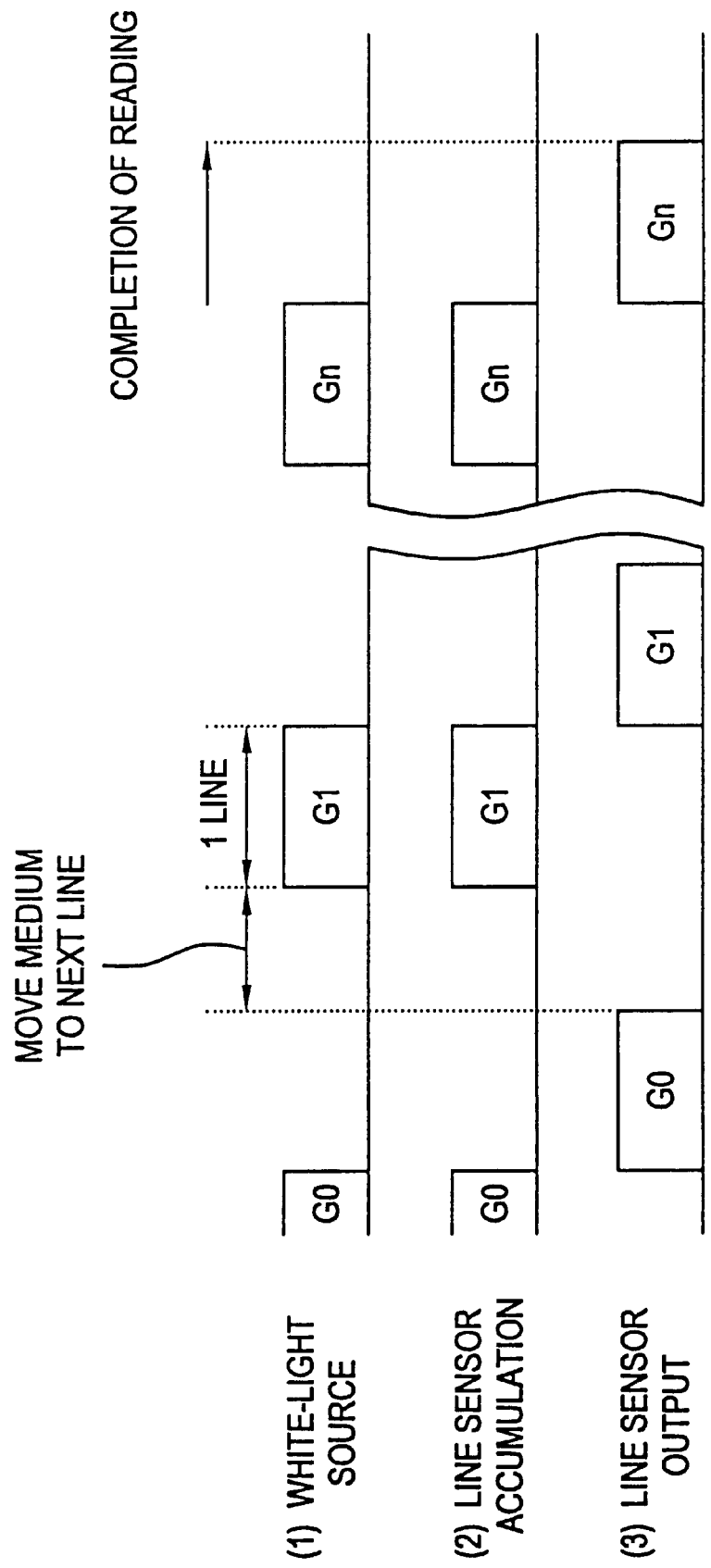
FIG. 26 is a time chart of the image reading by white light and G filter switching in the case of black and white reading.

FIGS. 23(a)–26 are time charts for image reading. FIGS. 23 (a) and (b) are a time charts for color reading via RGB filter switching and for black and white reading. FIGS. 24 (a) and (b) are time charts for color reading by the color image sensor and for black and white reading. FIG. 25 is a time chart for color reading by white light and RGB filter switching. FIG. 26 is a time chart for black and white reading by white light and a G filter.

Figure 27:
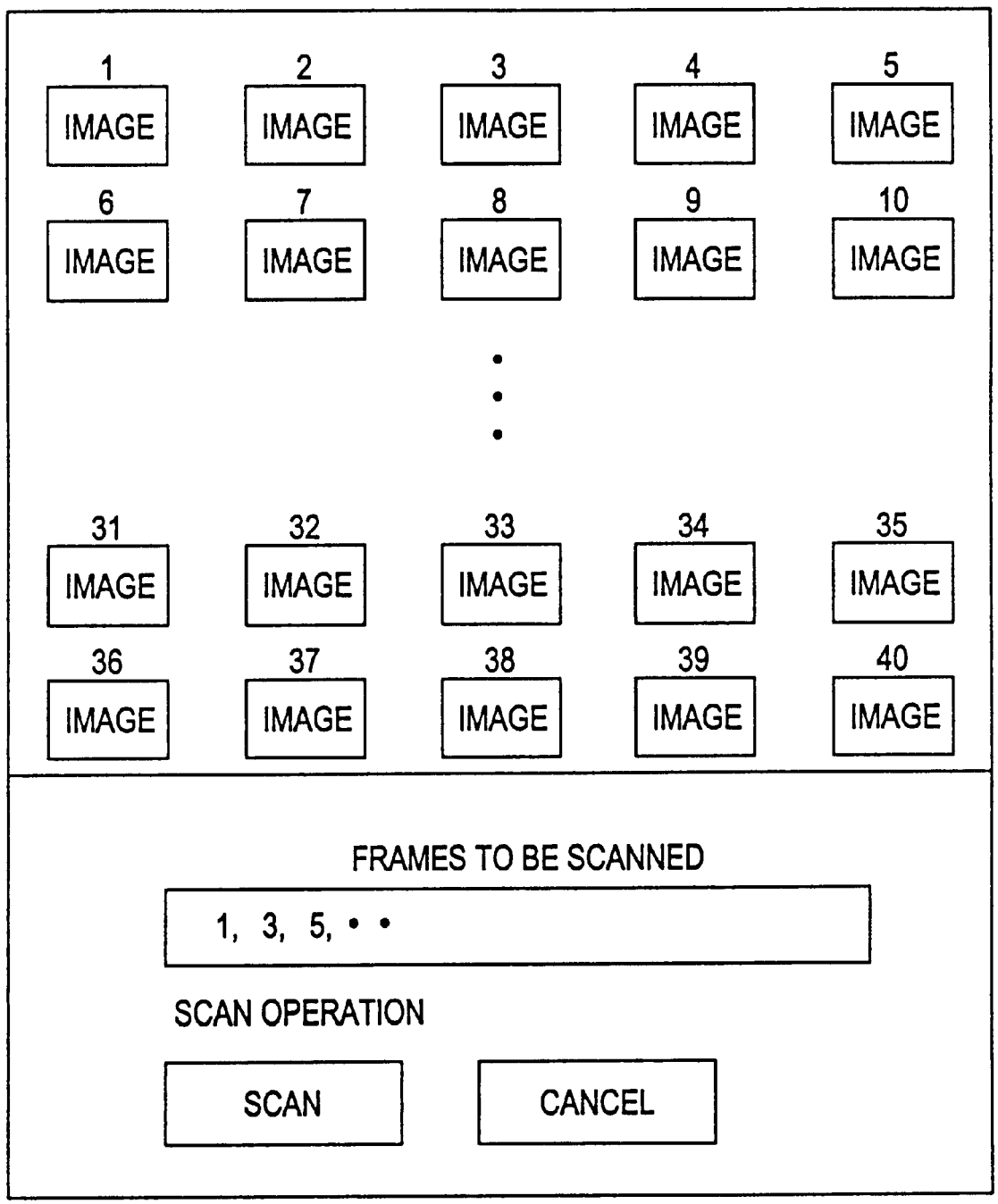
FIG. 27 is a diagram showing an example of a display of an images-only index display window.
Figure 31:
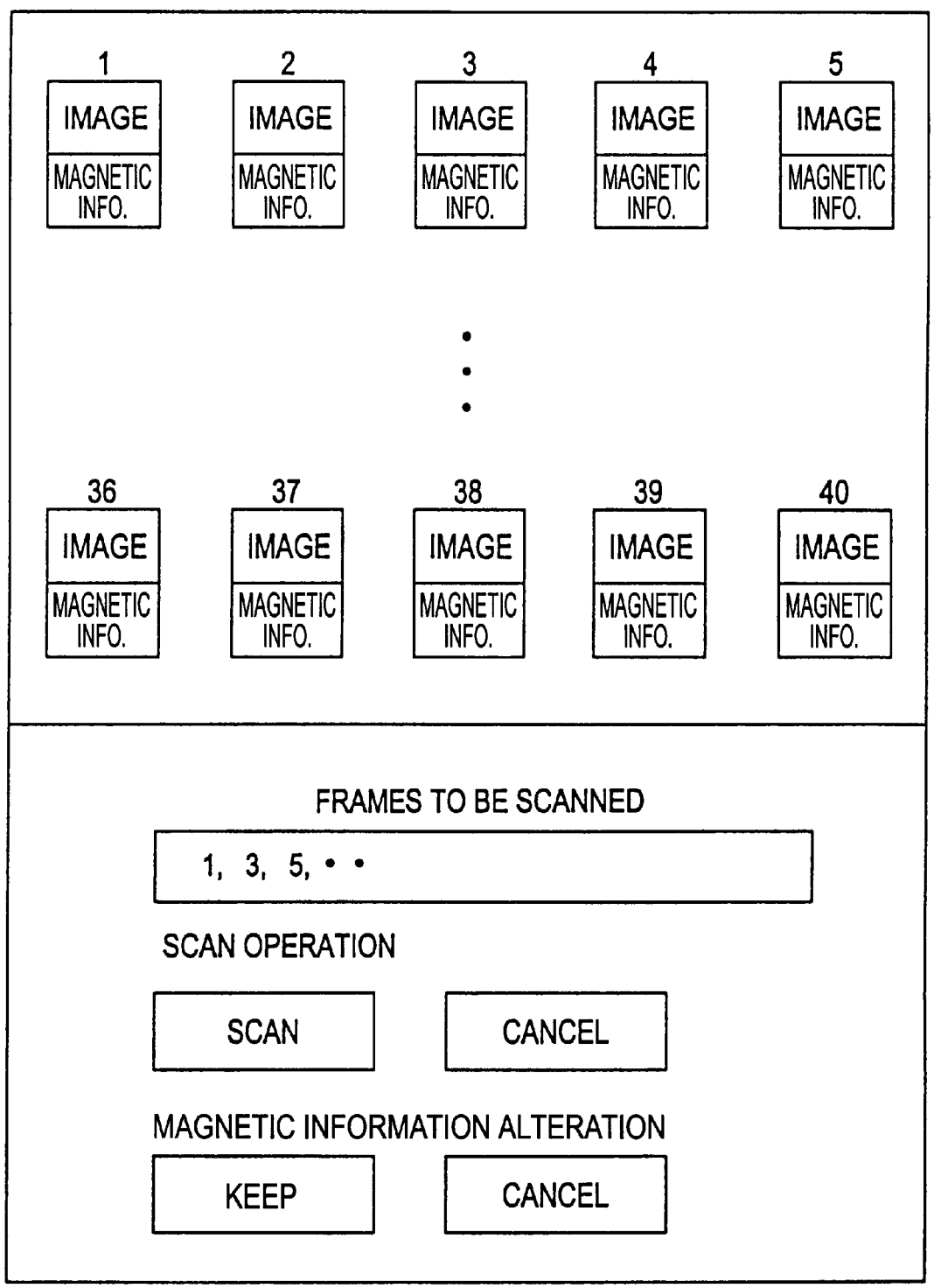
FIG. 31 is a diagram showing an example of a display of magnetic information and an image index display window.

FIG. 27 shows a display example of an index display window of only an image. FIG. 29 shows a display example to displaying only an index of magnetic information. FIG. 30 shows a magnification of the example shown in FIG. 29. FIG. 31 shows a display example of both image and magnetic information. FIG. 32 shows a magnified view of a frame in the index display window of FIG. 31.

Figure 33:
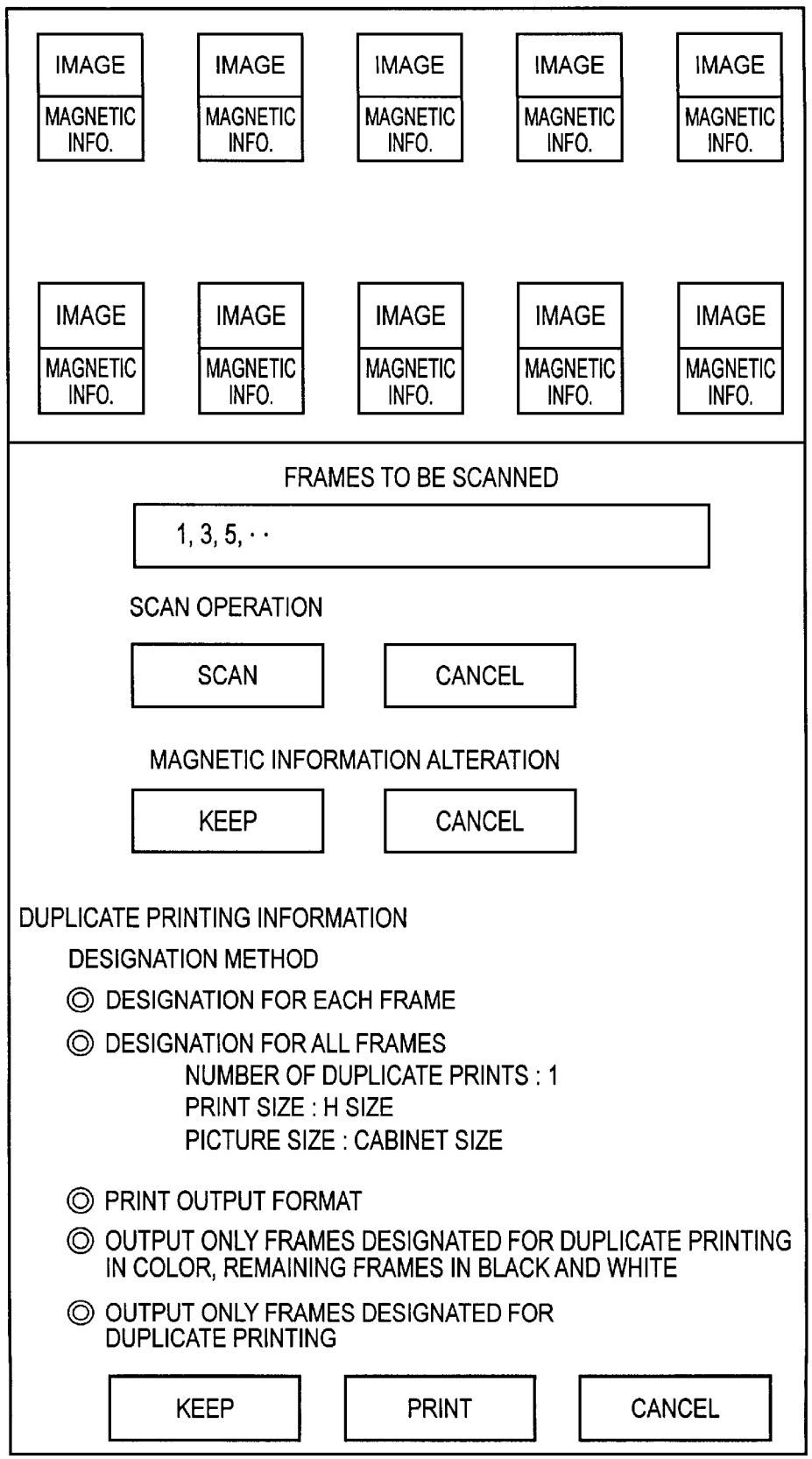
FIG. 33 is a diagram showing an example of an index display window capable of allowing duplicate printing to be designated.
Figure 35:
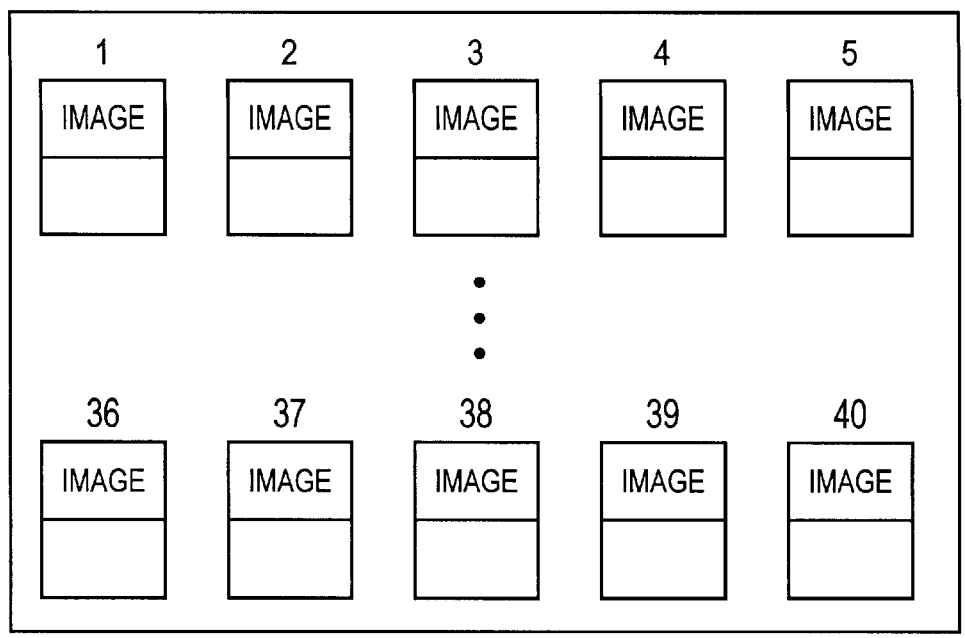
FIG. 35 is is a diagram of an index print showing all frame duplicate printing designations.
Figure 36:
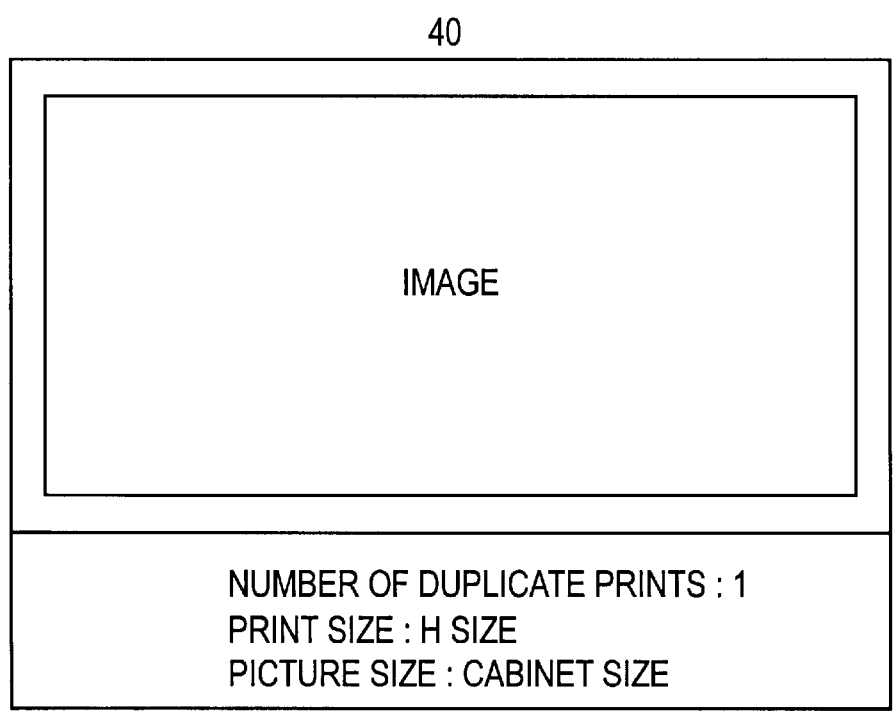
FIG. 36 is an enlarged diagram of one of the frames of the index print of FIG. 35.
Figure 39:
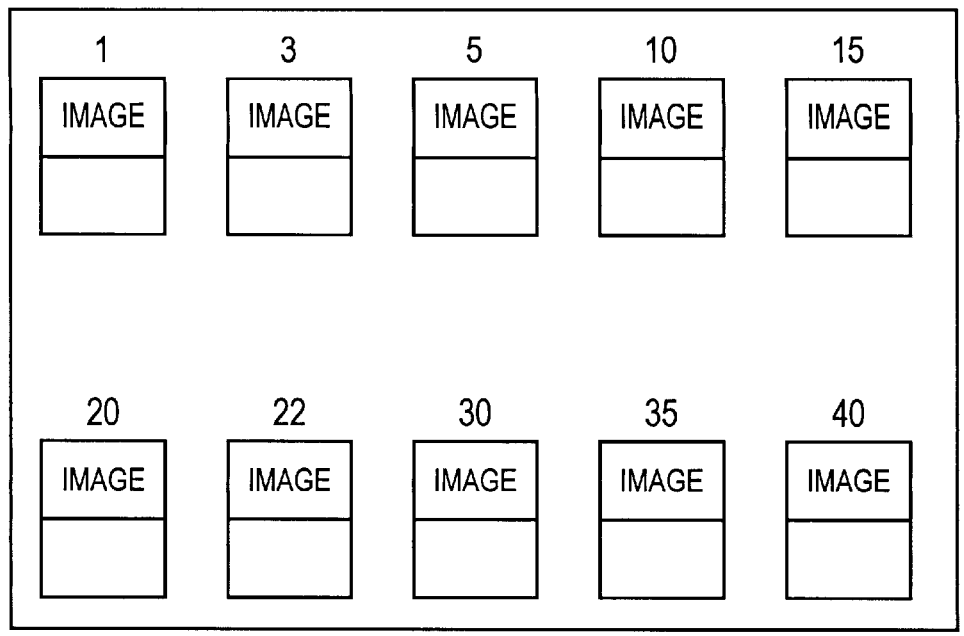
FIG. 39 is a diagram showing an index print of duplicate printing designation frames.
Figure 40:
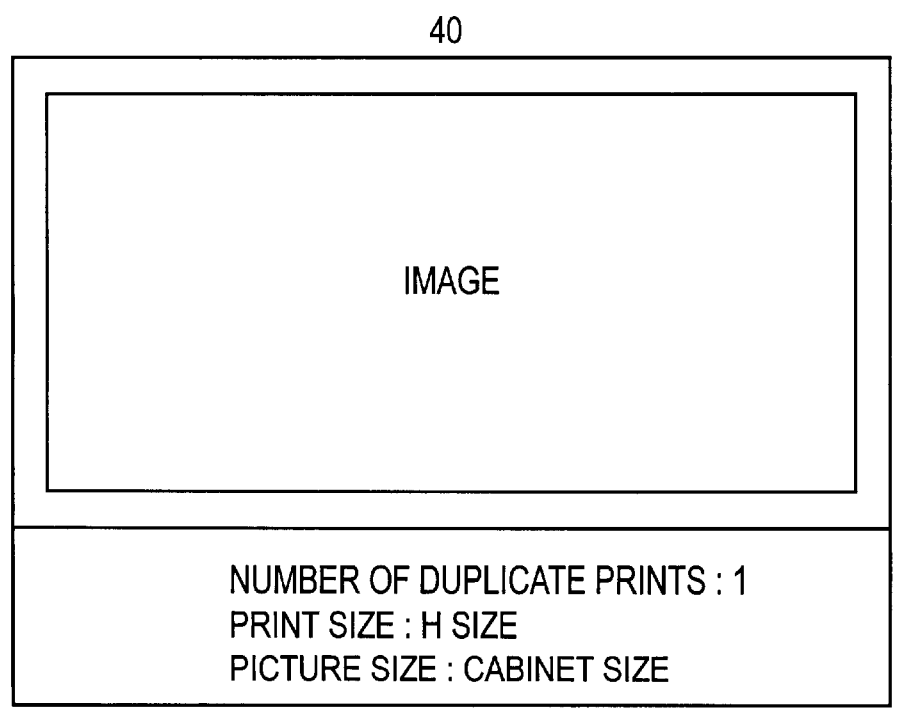
FIG. 40 is an enlarged diagram showing one of the frames of FIG. 29.

FIG. 33 is a display example of an index display window which can be used to designate duplicate printing. FIG. 34 is an enlargement of a frame in the index display window of FIG. 33. FIG. 35 shows an index print showing all frame duplicate printing designations. FIG. 36 is an enlargement of a frame shown in FIG. 35. FIG. 37 is an enlargement of a frame shown in FIG. 35. FIG. 38 is an enlargement of a frame without an index print duplicate printing designation. FIG. 39 shows an index print of a framed designated for duplicate printing. FIG. 40 is an enlargement of a frame in the index print of FIG. 39.

When the cartridge 17 is mounted, the CPU 1 performs initial operations in the order shown in FIGS. 3 and 4.

In step S1, the CPU 1 obtains data concerning the monitor size and the display color numbers from the host computer 19, and thereby determines the size and the display colors of the display monitor connected to the host computer.

There are various sizes available for display monitor sizes such as 640×480, 800×600, 1024×768. Moreover, there are various possible numbers of display colors, such as black and white, 16 colors, 16.7 million colors, and so on.

Control next proceeds to step S2, where the CPU 1 extracts selection window data from the memory 2 and outputs the extracted data to the host computer 19. As a result, the host computer 19 displays a selection window such as the one shown in FIG. 5(a).

Control next proceeds to step S3, where the CPU 1 determines whether selection and settings data have been entered by a user at the host computer 19. If selection and settings data have been entered, then control proceeds to step S4. If selection and settings data have not been entered, control returns to step S3.

In step 54, the selection window displayed on the display monitor at step S2 continues to be displayed, and motor driving is started to move the roll film.

Figure 5A:
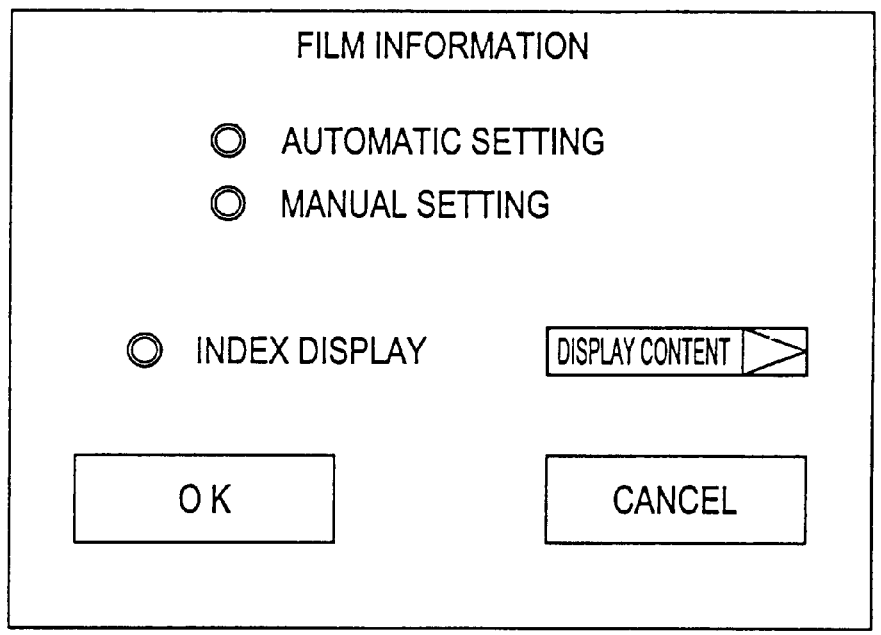
FIG. 5(a) is a drawing showing a selection window at the time initial operations are commenced.

In the selection window, each selection choice of "automatic setting," "manual setting" and "index display" is displayed with a corresponding selection button, as shown in FIG. 5(a). The selection choice "index display" is displayed adjacent a click button labeled "display content."

The selection choices "automatic setting" and "manual setting" allow the user to set parameters of the film image reading apparatus automatically or manually based on the film information.

A user selects "manual setting," for example, when the user desires to handle a mounted roll film 18 according to a different specification, e.g., to a specification that is different from a specification indicated on the roll film. A user can also select "manual setting" when the mounted roll film 18 is a new product, and corresponding film information is not provided in the film image reading apparatus.

Figure 5B:
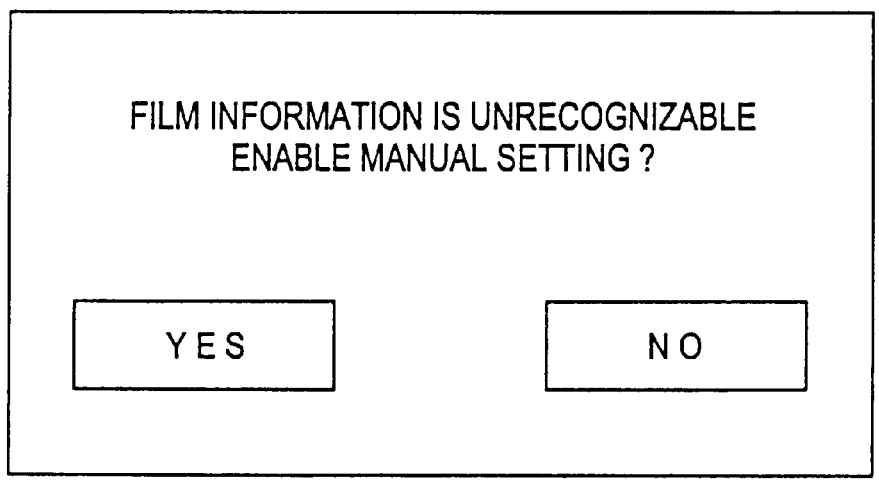
FIG. 5(b) is a drawing showing the selection window after the initial operations.

A user can also select "manual setting" when the fact that the mounted roll film 18 is a new product is unknown. This fact is detected at step S7, and will be explained later. In such a case, a warning statement such as "film information cannot be recognized" is displayed in the selection window as shown in FIG. 5(b). A user can select "manual setting" after seeing such a warning statement displayed in the selection window.

The selection choice "index display" allows the user to choose whether the index is displayed. The choice can be made by using the mouse to click on the button corresponding to the label "index display."

Using the mouse, the index display setting windows shown in FIGS. 8–10 are displayed and adjusted. The index display setting window data are data output by the CPU 1 to the host computer 19 as part of the selection window data.

The user can set the contents of the index display by selecting and setting the following choices in the index display setting window. Incidentally, in setting the contents of the index display, "initial setting" located in the window shown in FIG. 10 can be selected. In this case, the default values are set. The default values can be arbitrarily adjusted by the user.

In the index display setting window shown in FIG. 8, there are general selection choices of "display magnetic information only" and "display image only." When both are selected, a selection choice "display magnetic information and image" (not shown) is enabled.

FIGS. 8–10 show individual selection choices including choices regarding common choice (FIGS. 8 and 9), and designated frame magnetic information and designated frame image FIG. 10).

As shown in FIGS. 8 and 9, there are seven options within "common choice." They are 1-1, "frames to be displayed," 1-2, "order of displays;" 1-3, "vertical-to-horizontal ratio of display;" 1-4, "method of display;" 1-5, "method of simultaneous display of magnetic information and an image;" 1-6, "high speed display;" and 1-7, "duplicate printing designation."

In the choice 1-1, "frame" to be displayed," the frame to be displayed is selected and set from among the following options: "all frames"; "all frames that are shot"; "selection frame"; "H size only"; "C size only"; "P size only"; "horizontal position only;" and "vertical position only." The option "selection frame" is selected from the "frame table" shown in FIG. 9. The frame number of the selected frame selected is displayed in a column under "frames selected."

In the choice 1-2, "order of display," there are five choices: "from the first frame to the last frame in order", "from the last frame to the first frame in reverse order", "in the order of selection from the frame table", "in the order of print size," and "in the order of title."

In the choice of "from the first frame to the last frame in order," the selected frames are displayed in ascending order by frame number. In the choice of "from the last frame to the first frame in reverse order," the selected frames are displayed in descending order by frame number.

In the choice of "in the order of selection from the frame table," the frames selected in the selection choice "selection frame" are displayed according to the order in which they were selected by the user. In the choice of "in the order of print size," frames are displayed according to a predetermined order of size. For example, where the predetermined order of size is as 1.H, 2.C and 3.P, for example, frames are displayed in the size order H, C, P if the print sizes H, C, P are designated.

In the choice "in the order of title," frames are displayed in order according to a title stored in the magnetic memory region of each frame. In this choice, the images with the same content (and thus the same title) such as "sports day" and "vacation" are sorted out and displayed. Hence, the index images become very easy to observe in this choice.

Next, in the choice of 1-3, "vertical-to-horizontal ratio of display," the user can set a number of frames to be displayed vertically and a number of frames to be displayed horizontally.

In the choice of 1-4, "display method," one pattern can be selected from four display patterns, as shown in FIG. 9.

In the choice of 1-5, "method of simultaneous display of magnetic information and an image," one method can be selected from five display method options, as shown in FIG. 9. One of the options displays only an image to begin with. When this option is selected, a display altering button 31 located in the corner of the display window can be selected using the mouse. Selecting the button 31 switches the display between the image and magnetic information corresponding to the image.

Figure 28:
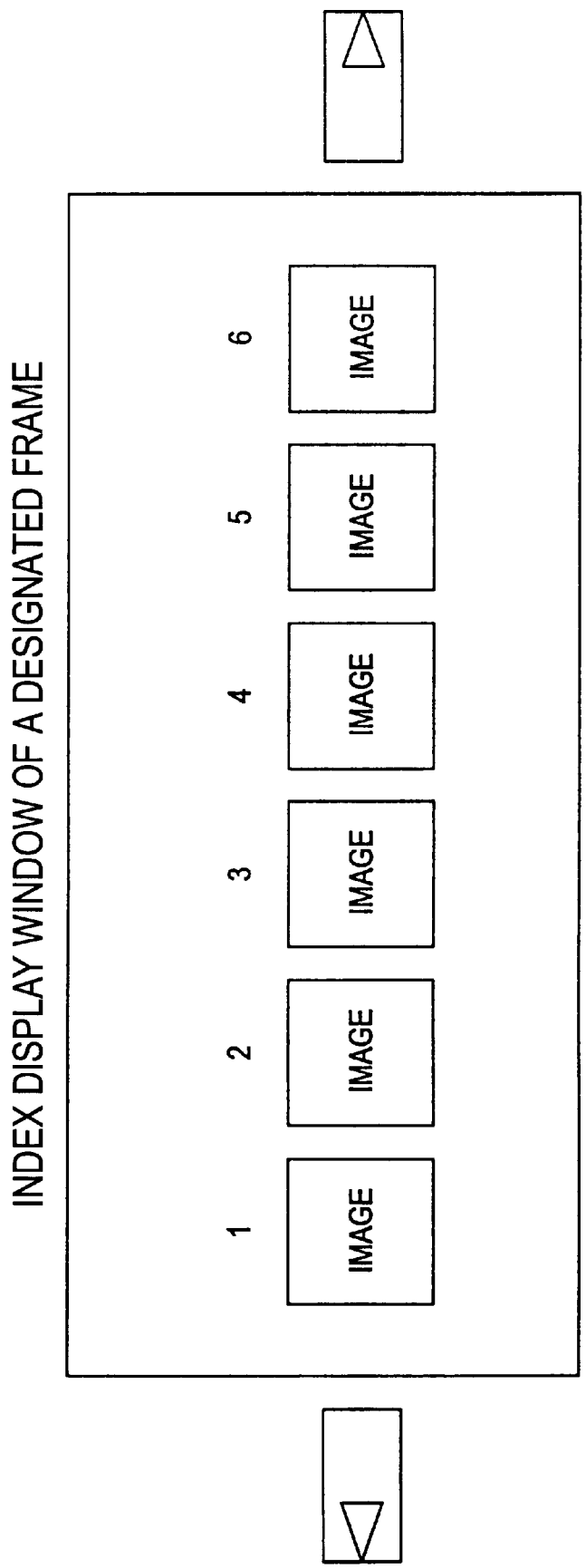
FIG. 28 is a diagram showing an example of a display of a designated frame index display window.

In the choice of 1-6, "high speed display," the number of frames to be displayed in the window is set. For example, if the user specifies six frames, the first six frames of the frames selected in "selection frame" are displayed as shown in FIG. 28. Moreover, if the left and right buttons shown in FIG. 28 are clicked using the mouse, the next six frames to the left or the right are scrolled and displayed.

In this display, only designated frame numbers are displayed, thus allowing the frames to be rapidly displayed. Each designated frame number as the corresponding frame is scrolled across the display. Thus, this display does not interfere with other displays. Moreover, if "high speed display" is selected, the CPU 1 need only read the designated frames. This allows the CPU 1 to quickly generate index display data.

When the user chooses 1-7, "duplicate printing designation," duplicate printing information is displayed for the index display window and for each frame in the window. The user also can designate the number of duplicate prints, the print size and the picture size for each frame on the index display window. See, e.g., FIGS. 33 and 34.

Next, in "designated frame information" as shown in FIG. 10, only one option is available, 2-1, "display information." The user can elect to display all of the frames or selected ones of the frames using 2-1, "display information." In order to display selected ones of the frames, the user clicks the right arrow button shown in FIG. 10 with the mouse. When the frames are displayed, a selection window replaces the setting window, and displays the title, shooting data, shooting conditions such as existence of strobe, time of scanning exposure, and so forth. The user can then modify the information displayed in the selection window.

Next, in the choice of 3, "designated frame image," there are four options as shown in FIG. 10: 3-1, "display range;" 3-2, "resolution per frame;" 3-3, "reading method;" and 3-4, "color decomposition."

In the choice of 3-1, "display range," the user sets the range of each frame to be displayed. The range can be chosen from "total range," "designated print size", "H size", "C size," and "P size." "H size", "C size", "P size," etc. are stored in the magnetic memory region 27. "Designated print size" is set by inputting from the keyboard the pixels of the display range (X1, Y1) and (X2, Y2).

In the choice of 3-2, "resolution per frame," the user can designate the resolution of an image to be displayed. In the choice of 3-3, "reading method," the user can select either "high speed reading" or "high quality reading."

If "high speed reading" is selected, the CPU 1 reads the designated frame based on an accumulation time, a diaphragm value and constant gamma characteristics of the line sensor 12. The CPU 1 then computes optimum values for the accumulation time, diaphragm value and gamma characteristics of the line sensor 12 based on the type and model of the film and the density of the film base material.

An approximate value of the density of the film base material can be obtained from the film information, In the first embodiment, the base density is measured during initial operations, and is then corrected if necessary.

If "high quality reading" is selected, then the CPU 1 computes optimum values for the accumulation time, diaphragm value and gamma characteristics for each designated frame, and reads each designated frame in accordance with the computed optimum values.

In the choice of 3-4, "color decomposition," the user can select either "RGB decomposition display" or "CMY decomposition display."

The user actuates the "OK" button shown in FIG. 10 after verifying that the selections and settings are correct. The host computer 19, in response to actuation of the "OK" button, outputs data corresponding to the selections and settings made by the user to the IF circuit 3.

At this point, the CPU 1 determines at step S3 of FIG. 3 whether selection/setting data has been received from the IF circuit 3. If the selection/setting data has been received from the IF circuit 3, control proceeds to step S4.

If the selection/setting data has not been entered, control returns to step S3, where the CPU 1 waits for the user to complete the selection/setting operation.

In step S4, the CPU 1 causes the motor 16 to turn and thus move the roll film 18. From step S4, control proceeds to step S5.

In step S5, the CPU 1 determines if a lead part 100 of the roll film 18 has come into reading range of the line sensor 12. This determination is made based on an output from the medium position detection sensor 13. If the CPU 1 determines that the lead part 100 has not come into reading range of the line sensor 12, then control returns to step S5 and the CPU 1 waits for the lead part 100 of the film to come into reading range of the line sensor 12. If the CPU 1 determines that the lead part 100 has come into reading range of the line sensor 12, then control proceeds to step S6.

At step S6, the CPU 1 measures a density of the base material of the film, or a base density of the film, according to output signals from the line sensor 12, as outlined further above. Control then proceeds to step S7.

At step S7, the CPU 1 reads the information contents of the bar code 24 using the optical information reading sensor 14, or reads the information contents of the magnetic memory unit 21 using the magnetic head 15. The information obtained from the bar code 24 or the magnetic memory unit 21 represents roll film information. The CPU 1 recognizes whether the roll film information can be used to obtain an accumulation time, a diaphragm value and gamma characteristics of the line sensor 12.

In the first embodiment, the CPU 1 performs the functions associated with step S7 based on a determination that a front edge of the roll film 18 has reached a predetermined position in step S5. Alternatively, the CPU 1 can perform the functions associated with step S7 based on detection of the perforation 22 in the front edge of the roll film 18 by the medium position detection sensor 13. From step S7, control proceeds to step S8.

At step S8, the CPU 1 determines whether the film information of the roll film 18 obtained in step S7 is recognizable. There are situations where the film information may not be recognizable. For example, if the roll film 18 is a new product and the apparatus does not have film information for the new product, the CPU 1 can determine that the information obtained from the roll film 18 is unrecognizable.

If the CPU 1 determines that the film information is recognizable, then control proceeds to step S10.

If the CPU 1 determines that the film information is unrecognizable, control proceeds to step S9. At step S9, the CPU 1 generates and outputs to the host computer 19 a warning message for display to the user, e.g., "film information is unrecognizable." Consequently, the host computer 19 displays a selection window such as one shown in FIG. 5(b) on the display monitor. In the selection window statements such as, "Film information is unrecognizable. Proceed with manual setting?" are displayed.

In the selection window of FIG. 5(b), the user can choose to enable manual setting by actuating either the "YES" button or "NO" button. The host computer 19 relays the user's choice to the CPU 1. Upon receiving the user's choice, the CPU 1 either changes or maintains the setting status, e.g., manual or automatic, and the current setting status is reflected in the selection window of FIG. 5(a).

For example, if the user actuates the "YES" button in the selection window of FIG. 5(b) while automatic setting is selected in the selection window of FIG. 5(a), then the automatic selection is changed to manual setting. On the other hand if the user actuates the "NO" button in the selection window of FIG. 5(b) while automatic setting is selected in the selection window of FIG. 5(a), the automatic setting is maintained.

From step S9, control moves to step S10. At step S10, the CPU 1 determines whether a first frame of the roll film has just reached the reading range of the line sensor 12, based on output from the medium position detection sensor 13. If the CPU 1 determines that the first frame has not reached the reading range of the line sensor 12, then control returns to step S10, and the CPU 1 waits until the first frame just reaches the reading range of the line sensor 12. If the CPU 1 determines that the first frame has just reached the reading range of the line sensor 12, then control proceeds to step S11.

In step S11, the CPU 1 stops driving of the motor 16 and completes the moving operation of the film 18.

From step S11, control moves to step S12 as shown in FIG. 4. In step S12, the CPU 1 determines whether automatic setting of film information is selected. If the CPU 1 determines that automatic setting of film information is not selected, then control proceeds from step S12 to S16. If the CPU 1 determines that automatic setting of film information is selected, then control proceeds from step S12 to step S13.

In step S13, the CPU 1 determines whether the film information is unrecognizable, thus confirming the determination made in step 99. If the CPU 1 determines that the film information is unrecognizable, then initial operations are complete and control goes into standby mode because automatic setting cannot be performed. If the CPU 1 determines that the film information is recognizable, then control proceeds to step S14.

At step S14, the CPU 1 outputs automatic setting window data to the host computer 19. AB a result, a film information automatic setting window such as the one in FIG. 6 is displayed on the display monitor of the host computer 19. In the film information automatic setting window, the film type, film model, total number of frames and the like are displayed as shown in FIG. 6. This display allows the user to verify the film information. From step S14, control proceeds to step S15.

In step S15 the CPU 1 sets each parameter of the apparatus to an optimal value for image reading based on the read film information and measured film density. From step S15 control moves to S19.

If in step S12 the CPU 1 determined that automatic setting of film information is not selected, then control proceeds from step S12 to S16.

In step S16 the CPU 1 outputs manual setting window data to the host computer 19. As a result, a film information manual setting window such as the one shown in FIG. 7 is displayed on the display monitor. Contents of the film information manual setting window include film type, film model, total number of frames and the like, as in the case of the film information automatic setting window displayed in step S14. In the film information manual setting window both buttons "OK" and "CANCEL" are displayed together. See, e.g., FIG. 7.

The user can use the keyboard of the host computer 19 to input film type, film model, total number of frames and the like in the film information manual setting window. If the user desires to readjust the settings and cancel the current setting adjustments, the user can actuate the "CANCEL" button. When the user desires to have the film image reading apparatus perform parameter setting operations based on the setting adjustments the user has entered, the user actuates the "OK" button. The host computer 19 responds to the user's actuation of the "OK" button by outputting data representing the user's adjustments to the IF circuit 3. From step S16, control proceeds to step S17.

In step S17 the CPU 1 determines whether the user has manually entered setting adjustments. If manual setting data has not been entered, then control returns to step S17 and the CPU 1 waits until the user enters setting adjustments. If manual setting data has been entered, then control proceeds to step S18.

In step S18 the CPU 1 sets each parameter of the image reading apparatus to achieve optimum conditions for reading the image, based on the manually adjusted film information and the measured film density. The parameters include accumulation time, diaphragm value and gamma characteristics and the like of the line sensor 12, as mentioned further above. From step S18 control proceeds to step S19.

In S19 the CPU 1 determines whether the index display is selected in the selection window shown in FIG. 5(*a*). If the index display is selected, then control proceeds to step S21 in FIG. 15, to commence the operation of generating data for the index display window. If the index display is not selected, then the CPU 1 completes the initial operations and goes into standby mode.

An explanation of the process of setting each parameter of the image reading apparatus to achieve optimum conditions for reading the image, as performed in steps S15 and S18, will now be given, after which generation of data for display in the index display window, e.g., FIGS. 15–22, will be explained.

FIG. 11 is a diagram showing a relationship between a scanning exposure amount of a negative film and a density of the negative film. In FIG. 11 the horizontal axis represents a scanning exposure amount (lux×seconds) while the vertical axis represents density. FIG. 11 shows characteristic curves of scanning exposure amount versus density for each of R, G and B.

In general, in the image reading apparatus a gamma characteristic curve is set in such a manner that the gamma characteristic curve becomes a curve which linearly corrects the characteristic curve of scanning exposure amount versus density. The characteristic curve of scanning exposure amount versus density of the film differs according to the model or type of the film. In other words, for a film X manufactured by company A and for a film Y manufactured by company B, different characteristic curves of scanning exposure amount versus density are necessary. The film model data regarding the model of the roll film are contained in the film information stored in the magnetic memory region 21 or bar code 24 in the lead part 100 of the roll film 18.

Accordingly, a gamma characteristic curve needs to be set for each film model according to the film model indicated in the film information read from the roll film 18. However, base densities vary from roll film to roll film even when the roll films are the same film model. Hence, characteristic curves of scanning exposure amount versus density often shift vertically. For this reason, in the case of different roll films of the same model, the gamma characteristic curve needs to be set to an optimum curve for each roll film, by measuring the base density and by correcting the gamma characteristic curve for each film accordingly.

A gamma characteristic curve for each model of the roll film is stored in the memory 12. The CPU 1 selects a gamma characteristic curve corresponding to the model of the roll film and stores the curve in the memory 2. The gamma characteristic curve stored in the memory 2 is used to perform gamma correction on image signals after the image signals have been converted from analog form to digital form.

Reading of images for an index display is performed with high speed in accordance with constant gamma characteristics. Accordingly, when reading images from the roll film for an index display, all the frames are read with gamma characteristics that are set according to the above method. Initial values for generally reading images from the roll film also include gamma characteristics that are set according to the above method. Hence, in a normal process of reading images from all frames of a roll film, the gamma characteristics set according to the above method are used until they are changed.

An accumulation time of the line sensor 12 is defined as the time during which the light receptor of the line sensor 12 performs photo-electric conversion by receiving light, and accumulates electric charge. A diaphragm value corresponds to the size of an aperture to be arranged between the roll film 18 and the line sensor 12. By adjusting the diaphragm value, the scanning exposure amount of the line sensor 12 is adjusted. Hence, the scanning exposure amount of the line sensor 12 depends on the accumulation time of the line sensor 12 and the diaphragm value which are controlled by the CPU 1. In normal image reading, a distribution of film-base density is measured for each frame, for example, during pre-scanning.

The scanning exposure time during the main scanning also is computed so that the output value of a brightest spot becomes the highest value on a scale of the A/D converter 8 (for example, 255 for the 8-bit A/D converter) based on the measured distribution of film-base density. The main scanning is performed with the scanning exposure time computed above. In this way an optimum image is obtained.

FIGS. 12–14 are diagrams showing different density distributions. In FIGS. 12–14, the horizontal axis represents the output values (0–255) of the A/D converter 8 while the vertical axis represents frequencies of occurrence of each value.

If the scanning exposure time is ideal during pre-scanning, the output value of the brightest spot becomes the middle value on the scale of the A/D converter 8 as shown in FIG. 12, enabling an accurate computation of the scanning exposure time during the main scanning process. In this way an optimum image can be obtained during the main scanning process.

However, if the scanning exposure time during pre-scanning is too long, the value of the bright section or spot of the roll film or medium being read becomes the maximum value on the scale of the A/D converter 8, i.e., 255, as shown in FIG. 13. Hence, an accurate computation of scanning exposure time necessary for the main scanning cannot be performed.

Furthermore, if the scanning exposure time during pre-scanning is too short, the density distribution becomes dense around small values as shown in FIG. 14. In this case, quantization error becomes too large. Accordingly, a necessary scanning exposure time for the main scanning cannot be accurately calculated.

Hence, in the present invention, the optimum scanning exposure time during pre-scanning is computed based on film information of the roll film and a measured base density, where the base is the brightest spot.

On the other hand, when reading images for an index display, high speed reading is performed using constant scanning exposure values. When reading images for the index display, the accumulation time of the line sensor 12 and the diaphragm value are held constant for all the frames of the roll film from which images are read. Hence, the scanning exposure amount of the line sensor 12 is determined so that the line sensor 12 does not saturate and an image having an appropriate brightness is obtained using the characteristic curve of the scanning exposure amount versus density of the film. A similar concept can be applied in the situation where a positive film is used instead of a negative film.

Next, an operation of the CPU 1 to generate and output data for an index display window to the host computer 19 will be shown with reference to FIGS. 15–26. FIG. 27 shows an operation of the host computer 19 to cause the display monitor to display the index displays shown in FIGS. 27–32, and will also be explained.

Next, operation of the CPU 1 to generate the index display window data including duplicate printing information, and to output the data to the host computer 19, will be described with reference to FIGS. 33 and 34. The operation of the host computer 19 to display an index display on the display monitor will also be described with reference to FIGS. 33 and 34. Moreover, operation of the host computer 19 to output index prints such as those shown in FIGS. 35–41 will also be described.

The following is an outline of the operation of the CPU 1 to generate the index display window data as shown in FIGS. 15–22. To begin with, the CPU 1 determines at steps S21 and S53 whether one of "magnetic information display" and "image display" has been selected in the index display setting window. Based on the result of the determination, the CPU 1 a) generates data for displaying only an image in an index display window (FIGS. 15–17), b) generates data for displaying only magnetic information in an index display window (FIGS. 18 and 19) and c) generates data for displaying both image and magnetic information in an index display window (FIGS. 20–22).

In the first step S21, as shown in FIG. 15, the CPU 1 determines whether the "magnetic information display" has been selected in the index display setting window. If the "magnetic information display" is selected, control moves to step S52 of FIG. 18. If the "magnetic information display" has not been selected, the CPU 1 indicates that only the "image display" is selected, and control moves to step S22 and the CPU 1 begins generating image display data in steps S22–S52.

In step S22, the CPU 1 determines whether "all frame display" has been selected. If "all frame display" has not been selected, then control moves to step S32 of FIG. 16. If "all frame display" is selected, control moves to step S23.

At step S23, the CPU 1 determines whether the display color number of the display monitor is in color. If the display color number of the display monitor is in color, control moves to step S24 and the CPU 1 completes the process by executing a color image display data generation process for all frames by performing steps S24–S27. If the display color number of the display monitor does not indicate color, control moves to step S28 and the CPU 1 completes the process by executing a black and white image display data generation process for all frames by performing steps S28–S31.

The color image display data generation process of steps S24–S27 is performed as follows. At step S24, the CPU 1 causes the motor 16 to rotate, and control proceeds to step S25. At step S25, the CPU 1 reads images of all frames in the film roll in three colors R, G and B with preset conditions. The method of reading a roll film image in three colors will be explained later with reference to FIGS. 23(a), 24(a) and 25. Upon completion of step S25, control moves to step S26.

At step S26, the CPU 1 causes the motor 16 to stop rotating, and control moves to step S27. In step S27 the CPU 1 outputs image data to be displayed in color on the display monitor of the host computer 19 according to preset conditions, and execution ends.

The black and white image display data generation process of steps S28–S31 is performed as follows. In step S28, the CPU 1 causes the motor 16 to rotate, and control proceeds to step S29. In step S29, the CPU 1 reads images from all frames by a green (G) color only, according to preset conditions, and control proceeds to step S30. The method of reading black and white images will be explained later with reference to FIGS. 23(b), FIG. 24(b) and FIG. 26.

In step S30, the CPU 1 causes the motor 16 to stop rotating, and control proceeds to step S31. In step S31, the CPU outputs image data to be displayed in black and white on the display monitor of the host computer 19 according to preset conditions, and execution ends.

As described further above, when in step S22 the CPU 1 determines that "all frame display" has not been selected, control moves to step S32 of FIG. 16.

In step S32, the CPU 1 determines whether "display all frames which have been shot" has been selected. If the "display of all frames that are shot" has not been selected, then control moves to step S44 of FIG. 17. If "display all frames which have been shot" has been selected, control moves to step S33.

At step S33, the CPU 1 determines whether the display color number of the display monitor indicates that the display is in color. If the display color number of the display monitor does not indicate color, then control proceeds to step S39 and the CPU 1 completes the process by generating black and white image display data for all frames which were shot by performing steps S39–S43. If the display color number indicates that the display is in color, then control proceeds to step S34 and the CPU 1 completes the process by generating color image display data for all frames which were shot by performing steps S34–S38.

The color image display data generation process of steps S34–S38 is performed as follows. At step S34, the CPU 1 begins rotation drive of the motor 16, and control proceeds to step S35. In step S35, the CPU 1 detects the number of frames which were shot with three colors R, G, G under preset conditions, and control proceeds to step S36. At step S36, the CPU 1 reads images from all the frames of the film roll which were shot using three colors, R, G and B with preset conditions, and control proceeds to step S37. At step S37, the CPU 1 causes the motor 16 to stop rotating, and control proceeds to step S38. At step 338, the CPU 1 outputs image data to be displayed in color on the display monitor of the host computer 19, in accordance with preset conditions, and execution ends.

The black and white image display data generation process of steps S39–S43 is performed as follows. At step S39, the CPU 1 causes the motor 16 to rotate, and control proceeds to step S40. At step S40, the CPU 1 detects the number of frames of the roll film which have already been shot, and control proceeds to step S41. At step S41, the CPU 1 reads images from all the frames of the film roll which have been shot, using only the G color according to preset conditions, and control proceeds to step S42. At step S42, the CPU 1 causes the motor 16 to stop rotating, and control proceeds to step S43. At step S43, the CPU 1 outputs image data to be displayed in black and white on the display monitor of the host computer 19, according to preset conditions.

In steps S25, S29, S36 and S41, the CPU 1 determines the display size for each frame, based on a relationship between the number of frames to be displayed and the size of the display monitor. The CPU 1 also sets a reading resolution so that a display size of each frame is optimal, and reads the images from the frames with the set reading resolution. As a result the host computer, which receives image data for display in steps S27, S31, S38 and S43, displays an image only index window for all the frames or for all the frames that have been shot. FIG. 27 shows an image only index window for all the frames.

The user can use the keyboard to set a frame number in the column labeled "frame to be scanned" after observing the index window displayed on the display monitor of the host computer 19. Alternatively, the user can set a frame number under the column "frame to be scanned" by using the mouse to click the image section or the number section of the frame in the index window. The user can actuate the "cancel" button if the frame number which is set in the column "frame to be scanned" needs to be canceled.

The host computer 19, in response to actuation of the "SCAN" button by the user, gives the frame number which is set in the column "frame to be scanned" to the IF circuit 3. Accordingly, the CPU 1 knows on which frame to perform main scanning.

As described further above, when in step 22 the CPU 1 determines that "display of all frames that are shot" has not been selected, control moves to step S44 of FIG. 17.

In step S44 the CPU 1 determines whether a display color number of the display monitor indicates that the display monitor is in color. If the display color number of the display monitor indicates that the display monitor is in color, then control moves to step S45 and the CPU 1 completes the process by generating color image display data for a designated frame by performing steps S45–48. If the display color number of the display monitor does not indicate that the display monitor is in color, then control moves to step S49 and the CPU 1 completes the process by generating black and white image display data for a designated frame by performing steps S49–S52.

The color image display data generation process of steps S45–48 is performed as follows. At step S45, the CPU 1 causes the motor 16 to rotate, and control proceeds to step S46. At step S46, the CPU 1 reads an image of a designated frame using three colors R, G and B according to preset conditions.

For example, at step S46, the CPU 1 moves the film roll 18 in such a manner that each selected frame reaches the reading position of the line sensor 12, based on detection signals from the medium position detection sensor 13. The CPU 1 selects the frame which matches the designation. The designation can include, for example, "H size only," "C size only," "P size only," "Horizontal position only" and "vertical position only" restrictions. Control then moves from step S46 to step S47.

At step S47, the CPU 1 causes the motor 16 to stop rotating, and control passes to step S48. At step S48, the CPU 1 outputs image data to be displayed in color on the display monitor of the host computer 19, according to preset conditions, and execution ends.

On the other hand, the black and white image display data generation process of steps S49–52 is performed as follows. At step S49, the CPU 1 causes the motor 16 to rotate, and control passes to step S50. At step S50, the CPU 1 reads the image of the designated frame using only the color G according to preset conditions, e.g., the accumulation time and so forth, as described further above. After execution of step S50, control proceeds to step S51. At step S51, the CPU 1 causes the motor 16 to stop rotating, and control proceeds to step S52. At step S52, the CPU 1 sends image data to be displayed in black and white on the display monitor of the host computer 19, according the preset conditions, and execution ends.

In steps S46 and S50, depending on the relationship between the number of designated frames and the monitor size, the CPU 1 can determine an appropriate reading resolution as described further above, taking the frame display size into consideration.

Moreover at steps S48 and S52, the CPU 1 reads and outputs a designated number of frames to be displayed at high speed, if "high speed display" is selected. In response, the host computer 19 displays an index window of a designated frame image such as the one shown in FIG. 28, on the display monitor.

When the user actuates one of the left and right click buttons in the window of FIG. 28 using the mouse, the host computer 19 outputs to the film image reading apparatus a number of designated frames to be displayed next at high speed. In response the CPU 1 reads and outputs to the host computer 19 the designated number of frames to be displayed at high speed.

When the user actuates one of the left and right click buttons in the window of FIG. 28 using the mouse, the above operation is repeated. As a result, in FIG. 28 if the number of frames is six, six designated frames are sequentially displayed each time the user actuates one of the left and right click buttons.

The user, observing the index window, can use the keyboard to set a frame number in the "frame to be scanned" column. The host computer 19, responding to an actuation of the "SCAN" button by the user, gives the frame number which is set in the "frame to be scanned" column to the IF circuit 3. Accordingly, the CPU 1 knows the frame for which main scanning is to be performed, as previously explained further above.

Here, the image reading method is as follows. Color reading of an image to be performed at steps S25, S36 and S46 will use one of three methods shown in FIGS. 23(*a*), 24(*a*) and 25.

In FIG. 23(*a*), an image reading method using a one-pass method is shown in which a light source that alternately emits one of R (red), G (green) and A (blue), and a black and white image sensor, which is a line sensor, are used. In the method shown in FIG. 23(*a*), one color of the light source is turned on for each line by switching in order from R (red), G (green) and B (blue), and one window is read for each movement of the film medium.

In FIG. 24(*a*), an image reading method using a one-pass method is shown in which a white-light light source and a color image sensor, which is a line sensor are used. In the method shown in FIG. 24(*a*), the color image sensor performs reading of R (red), G (green) and B (blue) for each line and one window is read for each movement of the film medium.

In FIG. 25 a method using a three-pass method is shown in which the image is read using a white-light light source, a black and white image sensor, which is a line sensor, and an RGB filter and a switching mechanism for the RGB filter. In the method shown in FIG. 25, switching of the RGB filter is performed every time reading of the first line to the last line is completed in the reading of one window. Each window is read three times, once with each color, and thus the reading of one window is accomplished by three movements of the film medium.

Figure 23B:
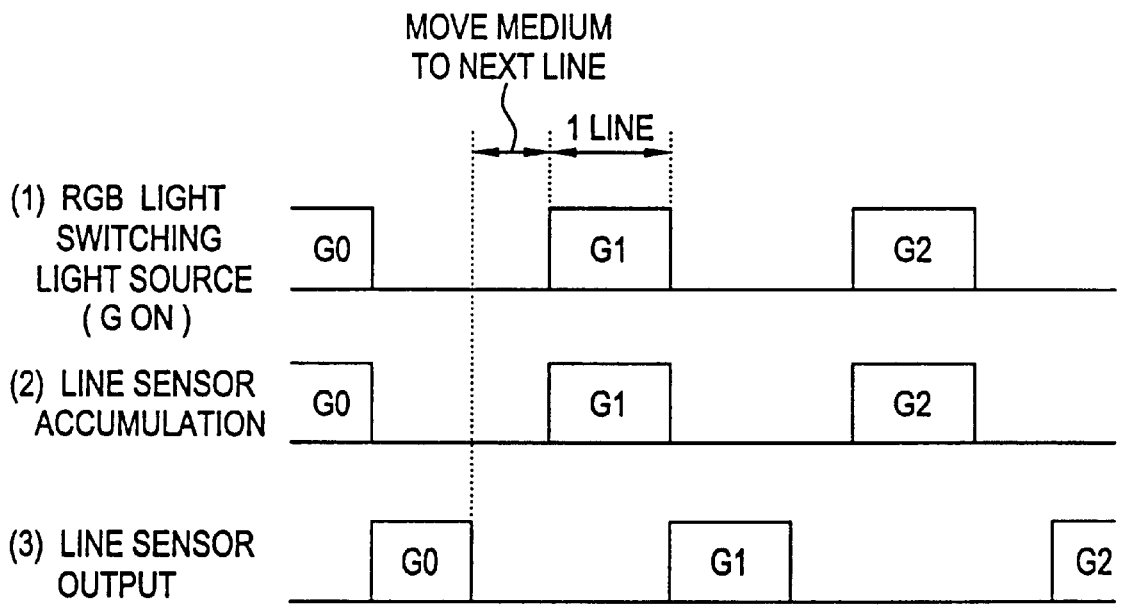
FIG. 23(b) is a time chart for black and white reading by RGB switching.

Next, the black and white reading of an image on a frame of the film roll as performed at steps S29, S41 and S50 is accomplished by one of three methods shown in FIGS. 23(b), 24(b), and 26.

In FIG. 23(b), image reading method using a one pass method is shown in which a G (green) light source of the light source that can turn on R (red), G (green) and B (blue) light interchangeably, and a black and white image sensor, which is a line sensor, are used. In other words, the method shown in FIG. 23(a) is a method in which each line is read using a G (green) light source only. Reading of one window is completed with one movement of the film medium. In this black and white reading method switching of the light source is not performed, but only the G (green) light source is used. Hence, compared to the color reading method shown in FIG. 23(a), high speed reading is possible.

The image reading method shown in FIG. 24(b) uses a one pass method and is similar to the method shown in FIG. 24(a). The method of FIG. 24(b) uses a white-light light source and a color image sensor, which is a line sensor, and is the same as the method shown in FIG. 24(a), with one difference. The difference is that although all three colors of image data are read, only the data corresponding to the G (green) color are delivered to the host computer 19. Thus, in the black and white reading method in which a color image sensor is used as a line sensor, only one third of the data are delivered to the host computer 19, and thus the black and white reading method has one third of the data volume of the color reading method. Accordingly, data transfer time to the host computer 19 and time required for data processing time are reduced substantially. Therefore, images can be read at a higher speed when using this black and white reading method instead of the corresponding color reading method.

FIG. 26 shows an image reading method using a one pass method. The image reading method uses a white-light light source, a black and white image sensor and a G (green) filter. In other words, the method shown in FIG. 26 is a method in which the G filter of the RGB filters is selected and used in the same structure as the method shown in FIG. 25. Hence, reading of one window is completed by one movement of the film medium. For this reason, the black and white reading method shown in FIG. 26 allows higher reading speeds than the color reading method shown in FIG. 25.

As described further above, when in step S21 of FIG. 15 the CPU 1 determines that the "magnetic information display" has been selected in the index display setting window, control moves to step S53 of FIG. 18.

In step S53, the CPU 1 determines whether "image display" is selected in the index display setting window. If "image display" has been selected, then both "magnetic information display" and "image display" have been selected, and control moves to step S69. If the "image display" is not selected, then only "display of magnetic information only" has been selected, and control moves to step S54.

In step S54 the CPU 1 determines whether "all frame display" is selected. If "all frame display" is selected then control moves to step S55 and the CPU 1 generates magnetic information display data for all the frames by performing steps S54–S58, and execution ends. If "all frame display" is not selected, then control moves to step S59 of FIG. 19.

The magnetic information display data generation process for all the frames begins at step S55, where the CPU 1 causes the motor 16 to rotate, and control moves to step S56. In step S56 the CPU 1 reads magnetic information of all the frames, according to the preset conditions, and control moves to step S57.

At step S57, the CPU 1 causes the motor 16 to stop rotating, and control moves to step S58. In step S58, the CPU 1 outputs magnetic information data to the host computer 19 for display on the display monitor according to the preset conditions, and execution ends.

As a result, the host computer 19 displays an index window of only magnetic information on the display monitor, such as in FIG. 29. The user, observing the index window, can use the keyboard to set a frame number in the "frame to be scanned" column. The user can also set a frame number in the "frame to be scanned" column by using the mouse to click the number section and the magnetic information section of the index window.

The host computer 19, in response to the user's actuation of the "SCAN" button, gives the frame number that is set in the "frame to be scanned" column, to the IF circuit 3, thus informing the CPU 1 the frame for which main scanning is to be performed.

As shown in FIG. 30, the user can also magnify and display the magnetic information for any frame by clicking the frame using the mouse. The contents of the magnetic information include title, date of shooting, shooting conditions and the like. Shooting conditions include information regarding whether a strobe is used, whether light is reversed, types of light sources and the like. The user can easily verify the magnetic information using the magnified display.

Moreover, the user can correct or add to the magnetic information, using the mouse and keyboard. The magnified display makes this altering operation easier for the user. The alterations are maintained in the host computer 19, by actuation of the "keep" button shown in FIG. 29. The host computer 19 provides the alterations to the IF circuit 3, thereby transferring the alterations to the CPU 1.

As described further above, when in step S54 the CPU 1 determines that "all frame display" is not. selected, then control moves to step S59 of FIG. 19.

In step S59 the CPU 1 determines whether "display of all the frames which have been shot" is selected. If the "display all the frames which have been shot" is selected, control passes to step S60 and the CPU 1 completes the present operation by generating magnetic information display data for the frames which were shot, by performing the steps S60–64.

At step S60, the CPU 1 causes the motor 16 to rotate, and control moves to step S61. At step S61, the CPU 1 detects the number of frames which have been shot, and control moves to step S62.

At step S62, the CPU 1 reads magnetic information of all the frames which have been shot according to the preset conditions, and control moves to step S63. At step S63, the CPU 1 causes the motor 16 to stop rotating, and control moves to step S64. At step S64, the CPU 1 outputs magnetic information data to the host computer 19 for display on the display monitor, according to the preset conditions.

As a result, the host computer 19 displays magnetic information of the frames which have been shot on the display monitor. In this case, the display format is the same as the display format shown in FIG. 27, Moreover, the display can be magnified and the user can make alterations such as corrections and additions.

If in step S59 the CPU 1 determines that the "display of all the frames which have been shot" is not selected, then the "selection frame" is selected, indicating that the process is being performed for selected designated frames, and control moves to step S65.

At step S65, the CPU 1 causes the motor 16 to rotate, and control moves to step S66. At step S66, the CPU 1 reads magnetic information of the designated frames according to the preset conditions, and control moves to step S67. At step S67, the CPU 1 causes the motor 16 to stop rotating, and control passes to step S68. At step S68, the CPU 1 outputs magnetic information data to the host computer 19 for display on the display monitor according to the preset conditions, and execution ends. As a result, the host computer 19 displays magnetic information of the designated frame on the display monitor. In this case, the display format is the same as the display format shown in FIG. 28. Moreover, the user can magnify the display and make alterations such as corrections and additions.

The display data generation process for the case in which both "magnetic information display" and "image display" are selected will be described in reference to FIGS. 20–22.

As described further above, when in step S53 the CPU 1 determines that "image display" has seen selected in the index display setting window, then both "magnetic information display" and "image display" have been selected, and control moves to step S69.

At step 369, the CPU 1 determines whether "all frame display" is selected. If "all frame display" is not selected, then control moves to step S79. If "all frame display" is selected, control moves to step S70.

At step S70, the CPU 1 determines whether the display color number indicates that the display monitor is in color. If the display color number on the display monitor does not indicate that the display monitor is in color, then control moves to step S75 and the CPU 1 completes the present process by generating black and white display data by performing the steps S75–78. If the display color number indicates that the display monitor is in color, then control proceeds to step S71 and the CPU 1 generates color display data by performing steps S71–74.

At step S71, the CPU 1 causes the motor 16 to rotate, and control moves to step S72. At step S72, the CPU 1 reads magnetic information and images of all the frames with three colors R, G and B, in accordance with the preset conditions. At step S73, the CPU 1 causes the motor 16 to stop rotating, and control moves to step S74. At step S74, the CPU 1 outputs magnetic information and image data to the host computer 19 for display in color on the display monitor, according to the preset conditions, and execution ends.

On the other hand, the black and white display data generation process of steps S75–78 is performed as follows. At step S75, the CPU 1 causes the motor 16 to rotate, and control passes to step S76. At step S76, the CPU 1 reads magnetic information and images of all the frames with only the G color, according to the preset conditions, and control passes to step S77. At step S77, the CPU 1 causes the motor 16 to stop rotating and control passes to step S78. At step S78, the CPU 1 outputs magnetic information and image data to the host computer 19 for display in black and white on the display monitor, according to the preset conditions.

As a result, the host computer 19 displays an index window on the display monitor in which magnetic information and images for each frame are combined, as shown for example in FIG. 31.

The user, observing the index window, can use the keyboard to set a frame number in the "frame to be scanned" column. In addition, the user can set the frame number In the "frame to be scanned" Column by using the mouse to click the number section and the image section of the index window. The host computer 19, in response to the user's actuation of the "SCAN" button, provides the frame number which is set in the "frame to be scanned" column to the IF circuit 3, thus indicating to the CPU 1 the frame for which main scanning is to be performed.

Moreover, as shown in FIG. 32, the user can magnify a frame and display the magnetic information of the frame by clicking on the frame using the mouse. The contents of the magnetic information include title, date of shooting, shooting conditions and the like. Shooting conditions include, for example, information indicating whether a strobe is used, whether light is reversed, types of light sources and the like. Moreover, the user can correct or add to the contents of magnetic information using the mouse and the keyboard. The alterations are maintained in the host computer 19, upon actuation of the "keep" button. The host computer 19 provides the alterations to the CPU 1 via the IF circuit 3, so that the CPU 1 can modify the magnetic information of the frame in question using the alterations.

As described further above, when in step S69 the CPU 1 determines that "all frame display" is not selected, control moves to step S79.

At step S79, the CPU 1 determines whether "display of all the frames which have been shot" is selected. If the "display of all the frames which have been shot" is selected, control proceeds to step S80 of FIG. 21. If the "display of all the frames which have been shot" is not selected, then control moves to step S91 of FIG. 22.

At step S80, the CPU 1 determines whether the display color number indicates that the display monitor is in color. If the display color number indicates that the display monitor is not in color, then the CPU 1 generates black and white display data by performing steps S86–90. If the display color number indicates that the display monitor is in color, then control moves to step S81 and the CPU 1 generates color display data by performing steps S81–85.

At step S81, the CPU 1 causes the motor 16 to rotate, and control moves to step S82. At step S82, the CPU 1 detects the number of frames which have been shot, and control moves to step S83. At step S83, the CPU 1 reads the magnetic information of all the frames which were shot according to the preset conditions, and the images of all the frames which were shot with three colors, RGB. Control then proceeds to step S84. At step S84, the CPU 1 causes the motor 16 to stop rotating, and control moves to step S85. At step S85, the CPU 1 outputs magnetic information and image data to the host computer 19 for display in color on the display monitor, according to the preset conditions.

On the other hand, the black and white display data generation process of steps S86–90 is performed as follows. At step S86, the CPU 1 causes the motor 16 to rotate, and control moves to step S87. At step S87, the CPU 1 detects the number of frames which have been shot, and control moves to step S88. At step S88, the CPU 1 reads the magnetic information of all the frames which were shot according to the preset conditions, and the images of all the frames which were shot with the G color only, and control moves to step S89.

At step S89, the CPU 1 causes the motor 16 to stop rotating, and control moves to step S90. At step S90, the CPU 1 outputs magnetic information and image data to the host computer 19 for display in black and white on the display monitor, according to the preset conditions. As a result, the host computer 19 displays magnetic information and the image of each frame on the display monitor. The display format is similar to that described further above, and the user can perform operations similar to those described further above.

As described further above, when in step S79 the CPU 1 determines that "display of all the frames which have been shot" is not selected, then control moves to step S91 of FIG. 22.

At step S91, the CPU 1 determines whether the display color number indicates that the display monitor is in color. It the display color number indicates that the display monitor is not in color, then the CPU 1 generates black and white display data by performing steps S96–99. If the display color number on the display monitor is in color, then control proceeds to step S92 and the CPU 1 generates color display data by performing steps S92–95.

At step S92, the CPU 1 causes the motor 16 to rotate, and control proceeds to step S93. At step S93, the CPU 1 reads the magnetic information of designated frame according to the preset conditions and the image of designated frames with three colors RGB, and control moves to step S94. At step S94, the CPU 1 causes the motor 16 to stop rotating, and control moves to step S95. At step S95, the CPU 1 outputs magnetic information and image data to the host computer 19 for display in color on the display monitor, according to the preset conditions.

The black and white data generation process of steps S96–S99 is performed as follows. At step S96, the CPU 1 causes the motor 16 to rotate, and control moves to step S97. At step S97, the CPU 1 reads the magnetic information of the designated frame according to the set conditions and the image of the designated frame with only the G color, and control moves to stop S98. At step S98, the CPU 1 causes the motor 16 to stop rotating, and control moves to step S99. At step S99, the CPU 1 outputs the magnetic information image data to the host computer 19 for display in black and white on the display monitor according to the preset conditions. As a result, the host computer 19 displays the magnetic information and the image for each designated frame in a format similar to the formats described further above. In addition, the user can also perform additions or alterations as described further above.

The image reading performed at steps S72, S76, S83, S88, S93 and S97 is performed using the method shown in FIGS. 23–26 and described further above. Moreover, as described further above, the reading resolution is set according to a relationship between the number of frames displayed and the monitor size.

Designation of duplicate printing to be performed using the index display window is performed as follows. As mentioned before, the CPU 1 makes an index display setting window (FIGS. 8–10) on the display monitor during initial operations. Moreover, the CPU 1 receives the settings data from the index display setting window. CPU 1 generates the index window data according to the setting data received. At this time, if 1-7, "duplicate printing designation" (FIG. 9) is selected on the index display setting window, the CPU 1 generates index display data containing duplicate printing information. As a result, the host computer 19 displays an index window such as the one shown in FIG. 33 on the monitor display of the host computer 19.

The index display window shown in FIG. 33 represents a situation in which both image and magnetic information are selected. In FIG. 33, a display of "duplicate printing information" and buttons labeled "keep", "print" and "cancel" are added to the index display window of FIG. 31. Moreover, in each selection choice of "duplicate printing information" a click button is also displayed. In other words, as shown in FIG. 33, the user can designate duplicate printing using the index display window.

Duplicate printing information consists of the designation method and the print output configuration. The designation method allows the user to designate selected frames or all frames for duplicate printing. Moreover, the print output configuration allows the user to choose whether to output a) all the frames, b) all the frames in black and white except for designated frames which are in color, or c) only frames designated for duplicate printing. The print output settings are configured when the user desires an index print. However, the print output settings need not be configured when the designations entered by the user are desired to be written in the roll film 18. The user causes the designations to be written on the roll film 18 by actuating the "keep" button, and causes the print output settings to be configured by actuating the "print" button.

To designate a frame for duplicate printing, the user first selects "each frame designation" using the mouse and selects a frame to be designated, using the mouse. The selected frame is enlarged and displayed as shown in FIG. 34. Moreover, the number of duplicate prints, print size and the picture size are displayed as duplicate printing information, as shown in FIG. 34. The user sets the desired number of duplicate prints by selecting the display section "number of duplicate prints" using the mouse, and then entering a number using the keyboard.

The user can set a print size by selecting the display section "print size" and then entering a desired print size using the keyboard. Alternatively, the host computer 19 can display the selection window of the print size on the monitor display, and the user can select appropriate information using the mouse. In a similar fashion, the user can set a picture size by selecting the display section "picture size" and then entering the picture size using the keyboard. Alternatively, the host computer 19 can display the selection window of the picture size on the monitor display, and the user can select appropriate information using the mouse.

Moreover, when making the same number of duplicates of all the frames, "All frames designation" can be selected in the window of FIG. 33 using the mouse, In order to set the "All frames designation" in the window of FIG. 33, the number of duplicate prints, print size and the picture size are displayed. The setting methods are the same as those described further above.

In other words, the user can set the number of duplicate prints by selecting the display section "number of duplicate prints" using the mouse, and then entering a number using the keyboard. The user can then set print size and picture size as described further above.

Moreover, when the user completes the setting operation described above and then actuates the "keep" button, the duplicate printing information settings are stored in the host computer 19, The host computer 19 sends the duplicate printing information with the write command to the CPU 1 through the IF circuit 3. The CPU 1 drives the motor 12 in forward and reverse directions by controlling the motor driving circuit 4 based on the output of the medium position detection sensor 13, and moves an appropriate magnetic memory unit into position near the magnetic head 15. Moreover, the CPU 1 sends duplicate printing information to the magnetic signal processing circuit 5, the magnetic signal processing circuit 5 converts the information to magnetic signals, and sends the magnetic signals to the magnetic head 15. As a result, the magnetic head 15 writes the duplicate printing information in the appropriate magnetic memory unit.

If the duplicate printing designation is the all frame designation, the duplicate printing information is written in the magnetic memory regions 21, 23 or in the magnetic memory region 27 of each frame. Moreover, if the duplicate printing designation is for specific frames, then the duplicate printing designation is written in the corresponding magnetic memory regions 27.

On the other hand, if the user is unable to perform magnetic information writing as described above, or if the user desires an index print, the user selects the print output format and actuates the "print" button instead of actuating the "keep" button. As a result, the printer prints index prints with the duplicate printing designations, as shown for example in FIG. 3. For each frame, duplicate printing information is printed and displayed as shown in FIG. 36.

When the user chooses "output only duplicate printing designation frame in color and the rest in black and white," the host computer 19 outputs index display image data to the printer via the printer port. The index display image data consists of only the duplicate printing designated frames in color and the rest of the frames in black and white. As a result, the printer prints and outputs the index prints consisting of only the duplicate printing designated frames in color and the rest in black and white. FIGS. 37 and 38 are enlargements of frames of such index prints.

The frames with the duplicate printing designation are displayed in color and the duplicate printing information is displayed as shown in FIG. 27. Frames without duplicate printing designations are displayed in black and white as shown in FIG. 38 and information indicating that there is no duplicate printing designation, is displayed.

If the user selects "output the frames with duplicate designation only," the host computer 19 outputs index display image data to the printer, through the printer port. The index display image data consist of only the duplicate printing designated frames in color. As a result, the printer prints and outputs the index prints consisting of only the duplicate printing designated frames in color as shown in FIG. 39. FIGS. 37 and 38 are enlargements of frames of such index prints. The duplicate printing information is printed and displayed on each frame as shown in FIG. 40.

In the preferred embodiment described above, a control program for execution by the CPU 1 is made to be stored in the memory 2 which is the memory medium of the film image reading device. Alternatively, the central processing apparatus of the host computer 19 can be used instead of the CPU 1. Moreover, the hard disk drive and the memory in the host computer 19 can be used instead of the memory 2. In that case, it is sufficient to have programs corresponding to the flow charts of FIGS. 3, 4 and 15–22 stored in the hard disk. By reading the programs stored in the hard disk into the memory of the host computer 19, it becomes possible for the central processing apparatus of the host computer 19 to execute the programs.

It is also sufficient to have a program corresponding to the flow charts of FIGS. 15–22 stored in the memory medium 19a such as a CD-ROM, so that the program can be set up in the host computer 19 beforehand.

While this invention has been described in conjunction with specific embodiments outlined above it is evident that many alternatives, modifications and variations will be apparent to those skilled in the art. Accordingly, the preferred embodiment of the invention as set forth herein is intended to be illustrative, not limiting. Various changes may be made without departing from the scope of the invention as defined in the following claims.

What is claimed is:

1. A film image reading device comprising:

a light source that illuminates a film original, the film original having image regions and a magnetic memory region for each image region;

an image sensor that outputs an image signal by photo-electrically converting light supplied to an image region of the film original from the light source;

a moving device that moves at least one of the film original and the image sensor relative to each other;

a magnetic information reader that reads magnetically stored information stored in the magnetic memory regions;

a memory that stores data for display in an index display setting window on a display of a host apparatus; and an index display window data generator that (a) receives signals output from the image sensor and from the magnetic information reader, wherein an accumulation time of the image sensor is predetermined based on setting data provided by the host apparatus to the film image reading device, the setting data having been selected in the index display setting window, the setting data indicating that high speed image reading is desired, and (b) generates index display window data for display on the display of the host apparatus.

2. A film image reading device comprising:

a light source that illuminates a film original, the film original having image regions and a magnetic memory region for each image region;

an image sensor that outputs an image signal by photo-electrically converting light supplied to an image region of the film original from the light source;

a moving device that moves at least one of the film original and the image sensor relative to each other;

a magnetic information reader that reads magnetically stored information stored in the magnetic memory regions;

a memory that stores data for display in an index display setting window on a display of a host apparatus;

a diaphragm through which light from the light source passes before being received by the image sensor; and an index display window data generator that (a) receives signals output from the image sensor and from the magnetic information reader, wherein a diaphragm value of the diaphragm is predetermined based on setting data provided by the host apparatus to the film image reading device, the setting data having been selected in the index display setting window, the setting data indicating that high speed image reading is desired, and (b) generates index display window data for display on the display of the host apparatus.

3. A film image reading device comprising:

a light source that illuminates a film original, the film original having image regions and a magnetic memory region for each image region;

an image sensor that outputs an image signal by photo-electrically converting light supplied to an image region of the film original from the light source;

a moving device that moves at least one of the film original and the image sensor relative to each other;

a magnetic information reader that reads magnetically stored information stored in the magnetic memory regions;

a memory that stores data for display in an index display setting window on a display of a host apparatus;

a gamma correction device that performs gamma correction on the image signal; and an index display window data generator that (a) receives signals output from the image sensor and the magnetic information reader, wherein the signals received from the image sensor are gamma transformed by the gamma correction device, the gamma characteristics of the gamma correction being predetermined based on setting data provided by the host apparatus to the film image reading device, the setting data having been selected in the index display setting window, the setting data indicating that high speed image reading is desired, and (b) generates index display window data for display on the display of the host apparatus.

4. A film image reading device comprising:

a light source that illuminates a film original, the film original having image regions and a magnetic memory region for a lead part of the film original and for each image region;

an image sensor that outputs an image signal by photoelectrically converting light supplied to an image region of the film original from the light source;

a moving device that moves at least one of the film original and the image sensor relative to each other;

a magnetic information reader that reads magnetically stored information stored in the magnetic memory region provided in the lead part of the film original;

a film information obtaining device that obtains film information from the magnetically stored information read by the magnetic information reader;

a recognition device that recognizes whether the film information obtained by the film information obtaining device can be used; and a setting device that sets scanning exposure conditions for the image sensor based on a recognition result of the recognition device.

5. A film image reading device of claim 4, further comprising:

a diaphragm through which light from the light source passes before being received by the image sensor, wherein:
the setting device sets a diaphragm value of the diaphragm to adjust scanning exposure conditions for the image sensor.

6. A film image reading device of claim 4, wherein the setting device sets an accumulation time of the image sensor to be a first accumulation time when the film original is a negative film and to be a second accumulation time when the film original is a positive film.

7. A film image reading device of claim 4, further comprising:

a data generator that generates recognition failure data for display on a display of a host apparatus when the recognition device recognizes that the obtained film information cannot be used, wherein the recognition failure data indicates that the obtained film information cannot be used.

8. A film image reading device of claim 4, further comprising:

a detector that detects a front edge of the film original being moved by the moving device, wherein:
the magnetic information reader reads magnetically stored information from the magnetic memory region of the film original in response to the detection of the detection device.

9. A film image reading device of claim 4, further comprising:

a perforation detector that detects a perforation in the film original that is closest to a front edge of the film original being moved by the moving device, wherein:
the magnetic information reader reads magnetically stored information from the magnetic memory region of the film original in response to the detection of the perforation detector.

10. A film image reading device comprising:

a light source that illuminates a film original, the film original having image regions, a magnetic memory region for a lead part of the film original and for each image region, and a bar code provided in the lead part of the film original;

an image sensor that outputs an image signal by photoelectrically converting light supplied to an image region of the film original from the light source, a moving device that moves at least one of the film original and the image sensor relative to each other;

a bar code reader that converts the bar code into a bar code signal;

a film information obtaining device that obtains film information from the bar code signal;

a recognition device that recognizes whether the film information obtained by the film information obtaining device can be used; and a setting device that sets scanning exposure conditions for the image sensor based on a recognition result of the recognition device.

11. A film image reading device of claim 10, further comprising:

a detector that detects a front edge of the film original being moved by the moving device, wherein:
the bar code reader converts the bar code into bar code signals in response to the detection of the detection device.

12. A film image reading device of claim 10, wherein the light source illuminates the bar code provided in the lead part of the film original, and the image sensor converts the bar code into the bar code signal.

13. A film image reading device of claim 10, further comprising:

a perforation detector that detects a perforation in the film original that is closest to a front edge of the film original being moved by the moving device, wherein:
the bar code reader converts the bar code into bar code signal in response to the detection of the perforation detector.

14. A film image reading device of claim 10, further comprising:

a diaphragm through which light from the light source passes before being received by the image sensor, wherein:
the setting device sets a diaphragm value of the diaphragm to adjust scanning exposure conditions for the image sensor.

15. A film image reading device of claim 10, wherein the setting device sets an accumulation time of the image sensor to be a first accumulation time when the film original is a negative film and to be a second accumulation time when the film original is a positive film.

16. A film image reading device of claim 10, further comprising:

a data generator that generates recognition failure data for display on a display of a host apparatus when the recognition device recognizes that the obtained film information cannot be used, wherein the recognition failure data indicates that the obtained film information cannot be used.

17. A film image reading device comprising:
a light source that illuminates a film original, the film original having image regions and a magnetic memory region for a lead part of the film and for each image region;
an image sensor that outputs an image signal by photoelectrically converting light supplied to an image region of the film original from the light source;
a moving device that moves at least one of the film original and the image sensor relative to each other;
a magnetic information reader that read magnetically stored information stored in the magnetic memory region provided in the lead part of the film original;
a film information obtaining device that obtains film information from the magnetically stored information read by the magnetic information reader; and
a setting device that estimates a density of the film original from the obtained film information and sets scanning exposure conditions for the image sensor based on the estimated density.

18. A film image reading device of claim 17, further comprising:
a measurement device that measures the density of the film original based on an output from the image sensor, and
a correction device that corrects the estimated density based on the measured density.

19. A film image reading device of claim 17, further comprising:
a diaphragm through which light from the light source passes before being received by the image sensor, wherein:
the setting device sets a diaphragm value of the diaphragm to adjust scanning exposure conditions for the image sensor.

20. A film image reading device of claim 17, wherein the setting device sets an accumulation time of the image sensor to be a first accumulation time when the film original is a negative film and to be a second accumulation time when the film original is a positive film.

21. A film image reading device of claim 17, further comprising:
a data generator that generates recognition failure data for display on a display of a host apparatus when a recognition device recognizes that the obtained film information cannot be used, wherein the recognition failure data indicates that the obtained film information cannot be used.

22. A film image reading device of claim 17, further comprising:
a detector that detects a front edge of the film original being moved by the moving device, wherein:
the magnetic information reader reads magnetically stored information from the magnetic memory region of the film original in response to the detection of the detection device.

23. A film image reading device of claim 17, further comprising:
a perforation detector that detects a perforation in the film original that is closest to a front edge of the film original being moved by the moving device, wherein:
the magnetic information reader reads magnetically stored information from the magnetic memory region of the film original in response to the detection of the perforation detector.

24. A film image reading device comprising:
a light source that illuminates a film original, the film original having image regions, a magnetic memory region for a lead part of the film original and for each image region, and a bar code provided in the lead part of the film original;
an image sensor that outputs an image signal by photoelectrically converting light supplied to an image region of the film original from the light source;
a moving device that moves at least one of the film original and the image sensor relative to each other;
a bar code reader that converts the bar code into a bar code signal;
a film information obtaining device that obtains film information from the bar code signal; and
a setting device that estimates an original density of the film original from the obtained film information and sets scanning exposure conditions for the image sensor based on the estimate.

25. A film image reading device of claim 24, further comprising:
a diaphragm through which light from the light source passes before being received by the image sensor, wherein:
the setting device sets a diaphragm value of the diaphragm to adjust scanning exposure conditions for the image sensor.

26. A film image reading device of claim 24, wherein the setting device sets an accumulation time of the image sensor to be a first accumulation time when the film original is a negative film and to be a second accumulation time when the film original is a positive film.

27. A film image reading device of claim 24, further comprising:
a data generator that generates recognition failure data for display on a display of a host apparatus when a recognition device recognizes that the obtained film information cannot be used, wherein the recognition failure data indicates that the obtained film information cannot be used.

28. A film image reading device of claim 24, further comprising:
a detector that detects a front edge of the film original being moved by the moving device, wherein:
the bar code reader converts the bar code into bar code signals in response to the detection of the detection device.

29. A film image reading device of claim 24, wherein the light source illuminates the bar code provided in the lead part of the film original, and the image sensor converts the bar code into the bar code signal.

30. A film image reading device of claim 24, further comprising:
a perforation detector that detects a perforation in the film original that is closest to a front edge of the film original being moved by the moving device, wherein:
the bar code reader converts the bar code into bar code signal in response to the detection of the perforation detector.

31. A film image reading device of claim 24, further comprising:
a measurement device that measures the density of the film original based on an output from the image sensor, and a correction device that corrects the estimated density based on the measured density.

32. A film image reading device comprising:

a light source that illuminates a film original, the film original having image regions and a magnetic memory region for a lead part of the film original and for each image region;

an image sensor that outputs an image signal by photo-electrically converting light supplied to an image region of the film original from the light source;

a moving device that moves at least one of the film original and the image sensor relative to each other;

a magnetic information reader that reads magnetically stored information stored in the magnetic memory regions;

a film information obtaining device that obtains film information from the magnetically stored information read by the magnetic information reader; and a data generator that generates selection window display data for display on a display so that a user of the film image reading device can alternately select between automatic setting of scanning parameters and manual setting of scanning parameters, the scanning parameters being used by the image sensor to read images from the image region of the film original.

33. A film image reading device of claim 32, further comprising:

a detector that detects a front edge of the film original being moved by the moving device, wherein:

the magnetic information reader reads magnetically stored information from the magnetic memory region of the film original in response to the detection of the detection device.

34. A film image reading device of claim 32, further comprising:

a perforation detector that detects a perforation in the film original that is closest to a front edge of the film original being moved by the moving device, wherein:

the magnetic information reader reads magnetically stored information from the magnetic memory region of the film original in response to the detection of the perforation detector.

35. A film image reading device comprising:

a light source that illuminates a film original, the film original having image regions, a magnetic memory region for a lead part of the film original and for each image region, and a bar code provided in the lead part of the film original;

an image sensor that outputs an image signal by photo-electrically converting light supplied to an image region of the film original from the light source;

a moving device that moves at least one of the film original and the image sensor relative to each other;

a bar code reader that converts information represented by the bar code into a bar code signal;

a film information obtaining device that obtains film information from the bar code signal; and a data generator that generates selection window display data for display on a display so that a user of the film image reading device can alternately select between automatic setting of scanning parameters and manual setting of scanning parameters, the scanning parameters being used by the image sensor to read images from the image region of the film original.

36. A film image reading device of claim 35, further comprising:

a detector that detects a front edge of the film original being moved by the moving device, wherein:

the bar code reader converts the bar code into bar code signals in response to the detection of the detection device.

37. A film image reading device of claim 35, wherein the light source illuminates the bar code provided in the lead part of the film original, and the image sensor converts the bar code into the bar code signal.

38. A film image reading device of claim 35, further comprising:

a perforation detector that detects a perforation in the film original that is closest to a front edge of the film original being moved by the moving device, wherein:

the bar code reader converts the bar code into bar code signal in response to the detection of the perforation detector.

39. A storage medium that stores a control process for controlling a film image reading device that includes: a light source that illuminates a film original, the film original having image regions and a magnetic memory region for each image region; an image sensor that outputs an image signal by photo-electrically converting light supplied to an image region of the film original from the light source; a moving device that moves at least one of the film original and the image sensor relative to each other; a magnetic information reader that reads magnetically stored information stored in the magnetic memory regions; and a memory that stores data for display in an index display setting window on a display; the control process comprising;

an index display window data generation procedure that receives signals output from the image sensor and from the magnetic information reader, by controlling an accumulation time of the image sensor to be a predetermined time based on setting data selected in the index display setting window, the setting data indicating that high speed image reading is desired; and generates index display window data for display on the display.

40. A storage medium that stores a control process for controlling a film image reading device that includes: a light source that illuminates a film original, the film original having image regions and a magnetic memory region for each image region; an image sensor that outputs an image signal by photo-electrically converting light supplied to an image region of the film original from the light source; a moving device that moves at least one of the film original and the image sensor relative to each other; a magnetic information reader that reads magnetically stored information stored in the magnetic memory regions; a memory that stores data for display in an index display setting window on a display; and a diaphragm through which light from the light source passes before being received by the image sensor; the control process comprising:

an index display window data generation procedure that receives signals output from the image sensor and from the magnetic information reader, by controlling a diaphragm value of the diaphragm to have a predetermined value based on setting data selected in the index display setting window, the setting data indicating that high speed image reading is desired; and generates index display window data for display on the display.

41. A storage medium that stores a control process for controlling a film image reading device that includes: a light source that illuminates a film original, the film original having image regions and a magnetic memory region for each image region; an image sensor that outputs an image signal by photo-electrically converting light supplied to an image region of the film original from the light source; a moving device that moves at least one of the film original and the image sensor relative to each other; a magnetic information reader that reads magnetically stored information stored in the magnetic memory regions; a memory that stores data for display in an index display setting window on a display; and a gamma correction device that performs gamma correction on the image signal; the control process comprising:

an index display window data generation procedure that receives signals output from the image sensor and the magnetic information reader, by controlling the gamma correction device to have predetermined gamma characteristics based on setting data selected in the index display setting window, the setting data indicating that high speed image reading is desired; and generates index display window data for display on the display.

42. A storage medium that stores a control process for controlling a film image reading device that includes: a light source that illuminates a film original, the film original having image regions and a magnetic memory region for a lead part of the film original and for each image region; an image sensor that outputs an image signal by photo-electrically converting light supplied to an image region of the film original from the light source; a moving device that moves at least one of the film original and the image sensor relative to each other; and a magnetic information reader that reads magnetically stored information stored in the magnetic memory region provided in the lead part of the film original; the control process comprising:

a film information obtaining procedure that obtains film information from the magnetically stored information read by the magnetic information reader;

a recognition procedure that recognizes whether the film information obtained in the film information obtaining procedure can be used; and a setting procedure that sets scanning exposure conditions for the image sensor based on a result of the recognition procedure.

43. A storage medium that stores a control process for controlling a film image reading device that includes: a light source that illuminates a film original, the film original having image regions, a magnetic memory region for a lead part of the film original and for each image region, and a bar code provided in the lead part of the film original; an image sensor that outputs an image signal by photo-electrically converting light supplied to an image region of the film original from the light source; a moving device that moves at least one of the film original and the image sensor relative to each other; and a bar code reader that converts the bar code into a bar code signal; the control process comprising:

a film information obtaining procedure that obtains film information from the bar code signal;

a recognition procedure that recognizes whether the film information obtained in the film information obtaining procedure can be used; and a setting procedure that sets scanning exposure conditions for the image sensor based on a result of the recognition procedure.

44. A storage medium that stores a control process for controlling a film image reading device that includes: a light source that illuminates a film original, the film original having image regions and a magnetic memory region for a lead part of the film and for each image region; an image sensor that outputs an image signal by photo-electrically converting light supplied to an image region of the film original from the light source; a moving device that moves at least one of the film original and the image sensor relative to each other; and a magnetic information reader that reads magnetically stored information stored in the magnetic memory region provided in the lead part of the film original; the control process comprising:

a film information obtaining procedure that obtains film information from the magnetically stored information read by the magnetic information reader; and a setting procedure that estimates a density of the film original from the obtained film information and sets scanning exposure conditions for the image sensor based on the estimated density.

45. A storage medium that stores a control process for controlling a film image reading device that includes: a light source that illuminates a film original, the film original having image regions, a magnetic memory region for a lead part of the film original and for each image region, and a bar code provided in the lead part of the film original; an image sensor that outputs an image signal by photo-electrically converting light supplied to an image region of the film original from the light source; a moving device that moves at least one of the film original and the image sensor relative to each other; and a bar code reader that converts the bar code into a bar code signal; the control process comprising:

a film information obtaining procedure that obtains film information from the bar code signal; and a setting procedure that estimates an original density of the film original from the obtained film information and sets scanning exposure conditions for the image sensor based on the estimate.

46. A storage medium that stores a control process for controlling a film image reading device that includes: a light source that illuminates a film original, the film original having image regions and a magnetic memory region for a lead part of the film original and for each image region; an image sensor that outputs an image signal by photo-electrically converting light supplied to an image region of the film original from the light source; a moving device that moves at least one of the film original and the image sensor relative to each other; and a magnetic information reader that reads magnetically stored information stored in the magnetic memory regions; the control process comprising:

a film information obtaining procedure that obtains film information from the magnetically stored information read by the magnetic information reader; and a data generation procedure that generate s selection window display data for display on a display so that a user of the film image reading device can alternately select between automatic setting of scanning parameters and manual setting of scanning parameters, the scanning parameters being used by the image sensor to read images from the image region of the film original.

47. A storage medium that stores a control process for controlling a film image reading device that includes: a light source that illuminates a film original, the film original having image regions, a magnetic memory region for a lead part of the film original and for each image region, and a bar code provided in the lead part of the film original; an image sensor that outputs an image signal by photo-electrically converting light supplied to an image region of the film original from the light source; a moving device that moves at least one of the film original and the image sensor relative to each other; and a bar code reader that converts information represented by the bar code into a bar code signal; the control process comprising:

a film information obtaining procedure that obtains film information from the bar code signal; and a data generation procedure that generates selection window display data for display on a display so that a user of the film image reading device can alternately select between automatic setting of scanning parameters and manual setting of scanning parameters, the scanning parameters being used by the image sensor to read images from the image region of the film original.

* * * * *